United States Patent
Yamazaki

(10) Patent No.: US 9,185,297 B2
(45) Date of Patent: Nov. 10, 2015

(54) IMAGE CAPTURE SYSTEM, CONTROL METHOD THEREOF AND IMAGE CAPTURE APPARATUS

(71) Applicant: CANON KABUSHIKI KAISHA, Tokyo (JP)

(72) Inventor: Tatsuya Yamazaki, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 112 days.

(21) Appl. No.: 13/963,377

(22) Filed: Aug. 9, 2013

(65) Prior Publication Data

US 2014/0049658 A1 Feb. 20, 2014

(30) Foreign Application Priority Data

Aug. 14, 2012 (JP) .................. 2012-179885

(51) Int. Cl.
*H04N 5/232* (2006.01)

(52) U.S. Cl.
CPC ......... *H04N 5/2328* (2013.01); *H04N 5/23254* (2013.01); *H04N 5/23258* (2013.01); *H04N 5/23267* (2013.01)

(58) Field of Classification Search
CPC .......... H04N 5/23248; H04N 5/23251; H04N 5/23254; H04N 5/23258; H04N 5/23264; H04N 5/23267; H04N 5/2327; H04N 5/23274; H04N 5/2328; H04N 5/23287

See application file for complete search history.

(56) References Cited

U.S. PATENT DOCUMENTS

| | | | |
|---|---|---|---|
| 2007/0122133 A1* | 5/2007 | Shiratori | 396/55 |
| 2009/0097832 A1* | 4/2009 | Yumiki et al. | 396/55 |
| 2009/0128636 A1* | 5/2009 | Wakagi et al. | 348/208.1 |
| 2011/0157381 A1* | 6/2011 | Miyasako | 348/208.5 |
| 2011/0194847 A1* | 8/2011 | Wakamatsu | 396/55 |
| 2012/0033092 A1* | 2/2012 | Sugaya | 348/208.1 |

FOREIGN PATENT DOCUMENTS

| | | |
|---|---|---|
| JP | 3925415 B | 6/2007 |
| JP | 4340915 B | 10/2009 |

* cited by examiner

*Primary Examiner* — Timothy J Henn

(74) *Attorney, Agent, or Firm* — Cowan, Liebowitz & Latman, P.C.

(57) ABSTRACT

An image capture system including a camera body and lens unit, a shake detection unit configured to detect a shake, an image stabilization unit arranged in the lens unit to correct a blur of the object image, a correction amount detection unit configured to detect a correction amount of the image stabilization unit, a distortion correction amount calculation unit configured to calculate a distortion correction amount of an image, a motion vector detection unit arranged in the camera body to detect a motion vector from the image captured by the image sensor, and a signal processing unit configured to correct the image based on the motion vector and an output from the distortion correction amount calculation unit.

12 Claims, 16 Drawing Sheets

VECTOR DETECTION FRAME

F I G. 10
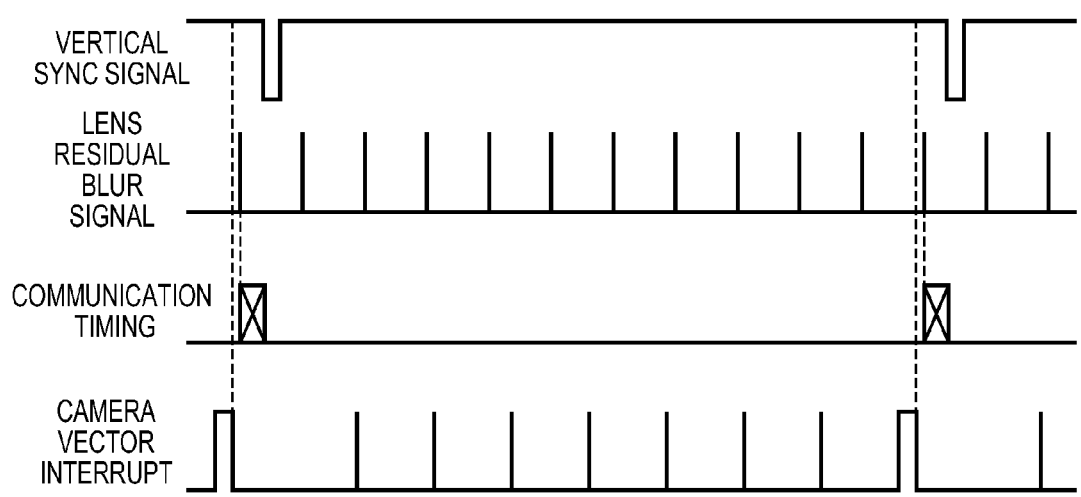

F I G. 15

SAMPLING A/D COUNTER VALUE FOR EACH SHUTTER SPEED

| Sample No. | SHUTTER SPEED | 1/60 | 1/90 | 1/120 | 1/250 | 1/500 |
|---|---|---|---|---|---|---|
| 1 | | 656 | 3681 | 6661 | 9686 | 11154 |
| 2 | | 1722 | 4436 | 7128 | 9842 | 11176 |
| 3 | | 2789 | 5214 | 7594 | 10019 | 11199 |
| 4 | | 3856 | 5969 | 8061 | 10175 | 11199 |
| 5 | | 4922 | 6747 | 8528 | 10353 | 11221 |
| 6 | | 5989 | 7503 | 8994 | 10508 | 11243 |
| 7 | | 7056 | 8258 | 9461 | 10664 | 11265 |
| 8 | | 8122 | 9036 | 9928 | 10841 | 11288 |
| 9 | | 9189 | 9792 | 10394 | 10997 | 11288 |
| 10 | | 10256 | 10569 | 10861 | 11175 | 11310 |
| 11 | | 11322 | 11325 | 11328 | 11331 | 11332 |

F I G. 16A
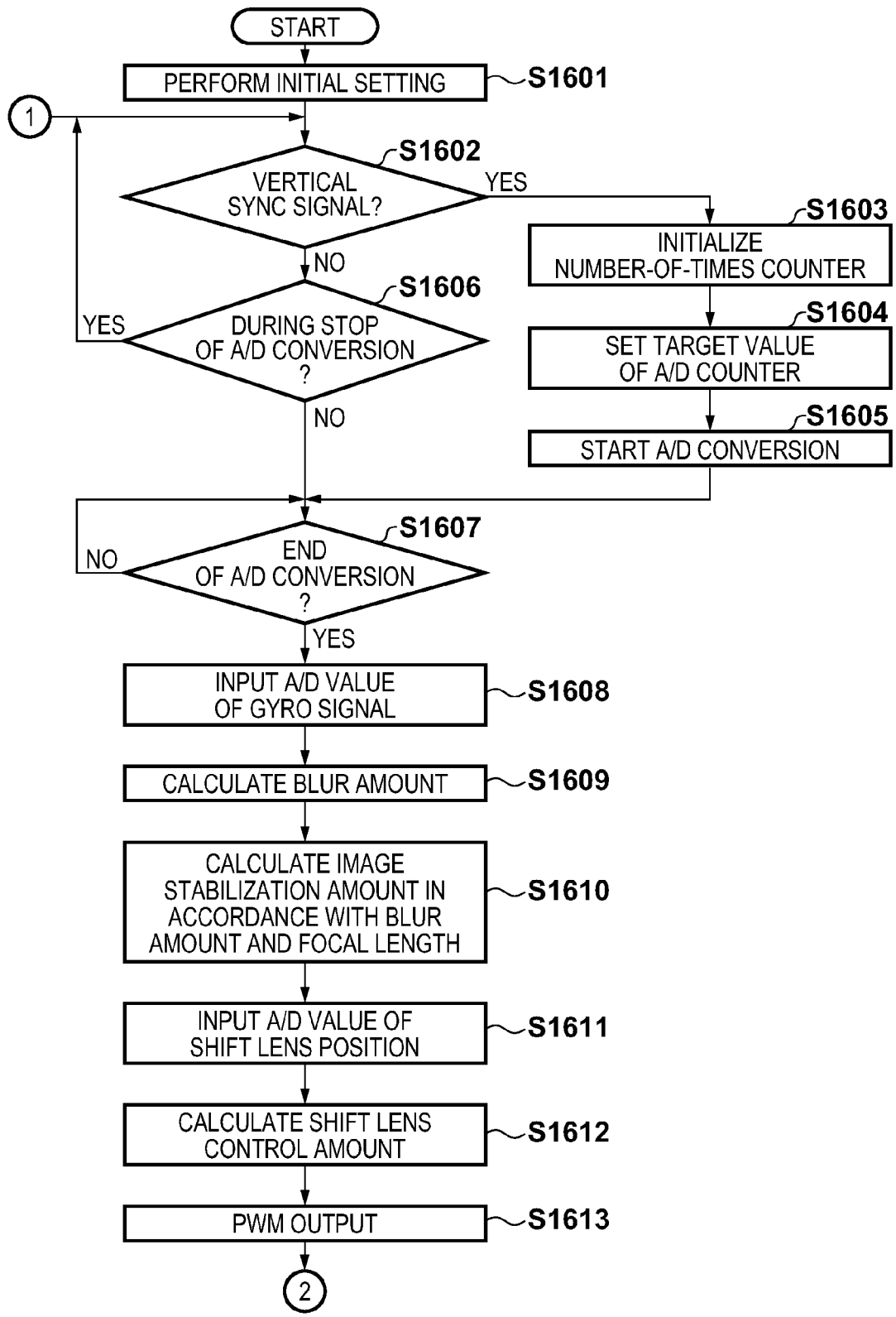

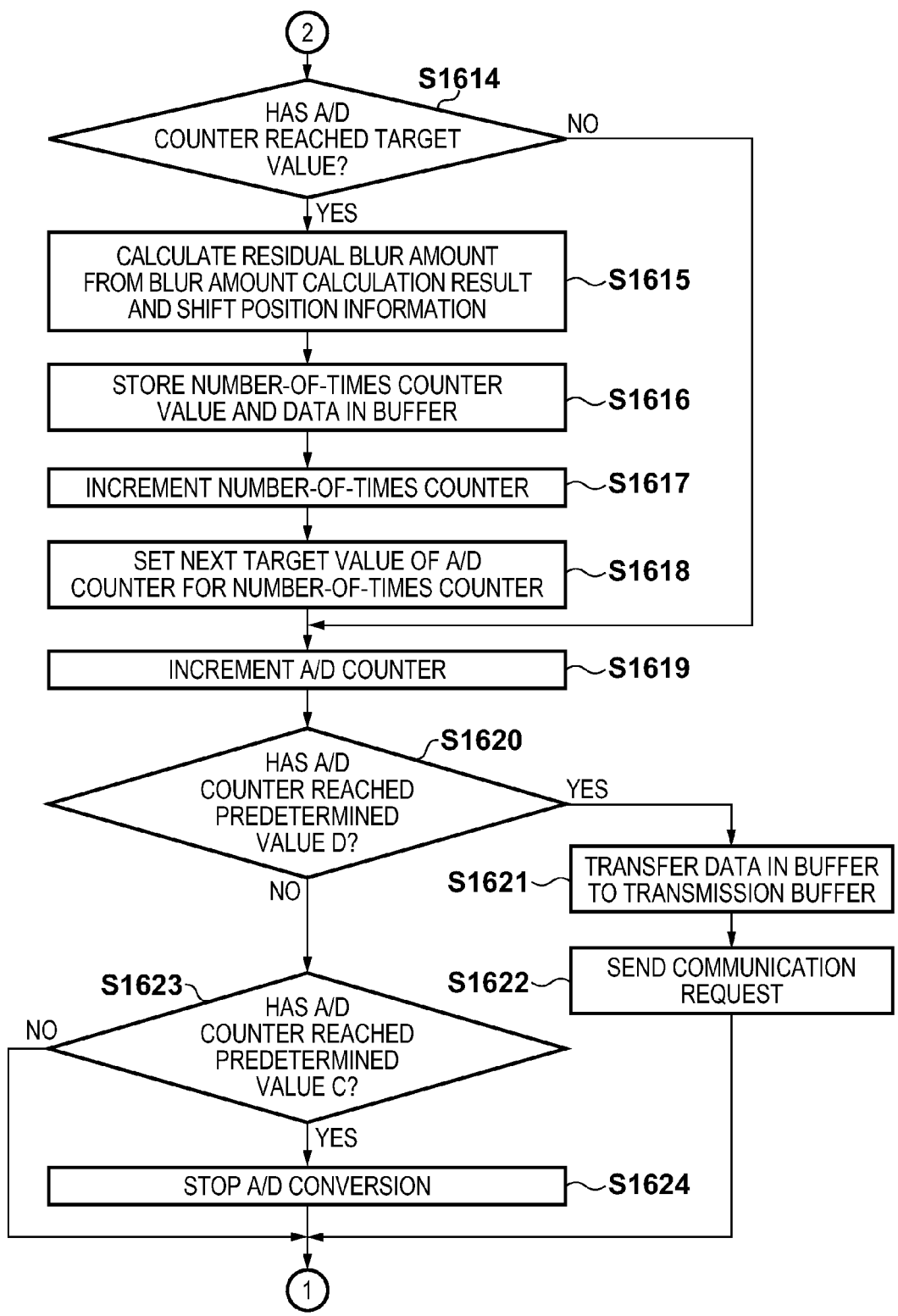

IMAGE CAPTURE SYSTEM, CONTROL METHOD THEREOF AND IMAGE CAPTURE APPARATUS

BACKGROUND OF THE INVENTION

1. Field of the Invention

The present invention relates to a technique of realizing satisfactory image stabilization in a lens-interchangeable image capture apparatus capable of movie shooting.

2. Description of the Related Art

Recently, not only still cameras but also video cameras of a lens-interchangeable type have been commercialized. Along with popularization of large-screen televisions and improvement of the video quality, these products have received attention as a means for obtaining a video the user expects. As a lens to be used, these products are designed to use, for example, an interchangeable lens for a single-lens reflex camera. The user can apply the property he always has. The image stabilization performance of image capture devices such as a video camera is improving year by year, and even a large blur generated when the user walks or runs can be corrected on the wide angle side of the lens.

Considering the image stabilization performance of a lens-interchangeable camera system, when an image stabilization shift lens arranged in the lens is greatly moved to correct a large blur during walking or the like on the wide angle side, some optical performances such as the peripheral brightness and MTF may be impaired. To stop a large blur during walking in this system, electronic correction needs to be performed in the camera. A large blur is corrected using extra pixels of an image sensor mounted in the camera for image stabilization.

As this image sensor, a CMOS sensor is often used nowadays. This is because the CMOS sensor has higher sensitivity, smaller power consumption, and lower cost, compared to a CCD sensor, and can read out data of each pixel at random. However, when electronic correction is performed by the CMOS sensor, a wobbling image distortion occurs under the influence of a rolling shutter distortion, causing an adverse effect such that the user who views the movie feels motion sickness.

As a method of correcting the rolling shutter distortion, Japanese Patent No. 3925415 discloses a method of correcting a rolling shutter distortion by using a gyro sensor output. Japanese Patent No. 4340915 discloses a method of detecting a motion vector from a captured video and correcting a rolling shutter distortion by using the detection result. By correcting the rolling shutter distortion, even an image capture apparatus which incorporates a CMOS sensor and performs electronic correction for a camera shake can achieve satisfactory image stabilization.

However, the rolling shutter distortion correction using motion vector detection has problems such as a correction error arising from a motion vector detection error, and a long processing time. It is therefore difficult to use this correction in movie processing directly. When distortion correction is performed using a gyro signal, an output from a gyro sensor arranged in the lens or camera is used. In a camera system in which an optical image stabilization mechanism is mounted in a lens, an image formed on the CMOS sensor is an image having undergone optical axis correction by the image stabilization mechanism. That is, the correlation between a gyro output and a formed video is lost. For this reason, if a rolling shutter distortion is corrected simply using only a gyro output, the influence of the distortion is not completely removed, or over-correction is executed, leaving a wobbling image.

SUMMARY OF THE INVENTION

The present invention has been made to solve the above problems, and realizes satisfactory image stabilization in a lens-interchangeable image capture apparatus capable of movie shooting.

According to the first aspect of the present invention, there is provided an image capture system including a camera body and a lens unit detachable from the camera body, comprising: an image sensor configured to capture an object image formed by the lens unit, wherein the image sensor is arranged in the camera body; a motion vector detection unit configured to detect a motion vector from the image, wherein the motion vector detection unit is arranged in the camera body; a shake detection unit configured to detect a shake; an image stabilization unit configured to correct an image shake of the object image by an output from the shake detection unit, wherein the image stabilization unit is arranged in the lens unit; a correction amount detection unit configured to detect an optical image stabilization amount by the image stabilization unit; a distortion correction amount calculation unit configured to calculate a distortion correction amount of an image captured by the image sensor, based on a difference between an output from the shake detection unit and an output from the correction amount detection unit; and a distortion correction unit configured to correct a distortion of the image based on the motion vector and an output from the distortion correction amount calculation unit.

According to the second aspect of the present invention, there is provided an image capture apparatus in which a lens unit is detachable from a camera body, comprising: an image sensor configured to capture an object image formed by the lens unit; a motion vector detection unit configured to detect a motion vector from the image; a shake information reception detection unit configured to receive shake information detected by a shake detection unit; a position reception unit configured to receive position information of an optical image stabilization member; a residual blur amount calculation unit configured to calculate a residual blur amount based on the shake information and the position information; a distortion correction amount calculation unit configured to calculate a distortion correction amount of an image captured by the image sensor based on the residual blur amount; and a distortion correction unit configured to correct a distortion of the image based on the motion vector and an output from the distortion correction amount calculation unit.

According to the third aspect of the present invention, there is provided an image capture system including a camera body and a lens unit, the lens unit comprising: an image stabilization unit configured to correct an image shake of an object image by an output from the shake detection unit; a correction amount detection unit configured to detect an optical image stabilization amount by the image stabilization unit; and a position detection unit configured to detect a position of the image stabilization unit and output position information, and the camera body comprising: an image sensor configured to capture an object image formed by the lens unit; a motion vector detection unit configured to detect a motion vector from the image; a shake detection unit configured to detect a shake; a distortion correction amount calculation unit configured to calculate a distortion correction amount of an image captured by the image sensor, based on an output from the shake detection unit and the position information from the position detection unit; and a distortion correction unit configured to correct a distortion of the image based on the motion vector and an output from the distortion correction amount calculation unit.

According to the fourth aspect of the present invention, there is provided a method of controlling an image capture system including a lens unit, and a camera body from which the lens unit is detachable and which includes an image sensor arranged therein to capture an object image formed by the lens unit, comprising: a shake detection step of detecting a shake; an image stabilization step of driving a correction member in the lens unit to correct a blur of the object image that is generated based on an output of the shake detection step; a correction amount detection step of detecting a correction amount of the correction member; a distortion correction amount calculation step of calculating a distortion correction amount of an image captured by the image sensor, based on information of a difference between an output from the shake detection step and an output from the correction amount detection step; a motion vector detection step of detecting a motion vector from the image captured by the image sensor; and a signal processing step of correcting the image captured by the image sensor based on the motion vector detected in the motion vector detection step and an output from the distortion correction amount calculation step.

Further features of the present invention will become apparent from the following description of exemplary embodiments with reference to the attached drawings.

BRIEF DESCRIPTION OF THE DRAWINGS

FIG. 10 is a timing chart showing a control timing in the vertical sync period in the second embodiment;

FIG. 15 is a table showing the data sampling A/D conversion count from the beginning of the vertical sync period in accordance with the shutter speed; and FIGS. 16A and 16B are flowcharts showing control in a lens in the fifth embodiment.

DESCRIPTION OF THE EMBODIMENTS

Embodiments of the present invention will now be described in detail with reference to the accompanying drawings.

First Embodiment

Figure 1:
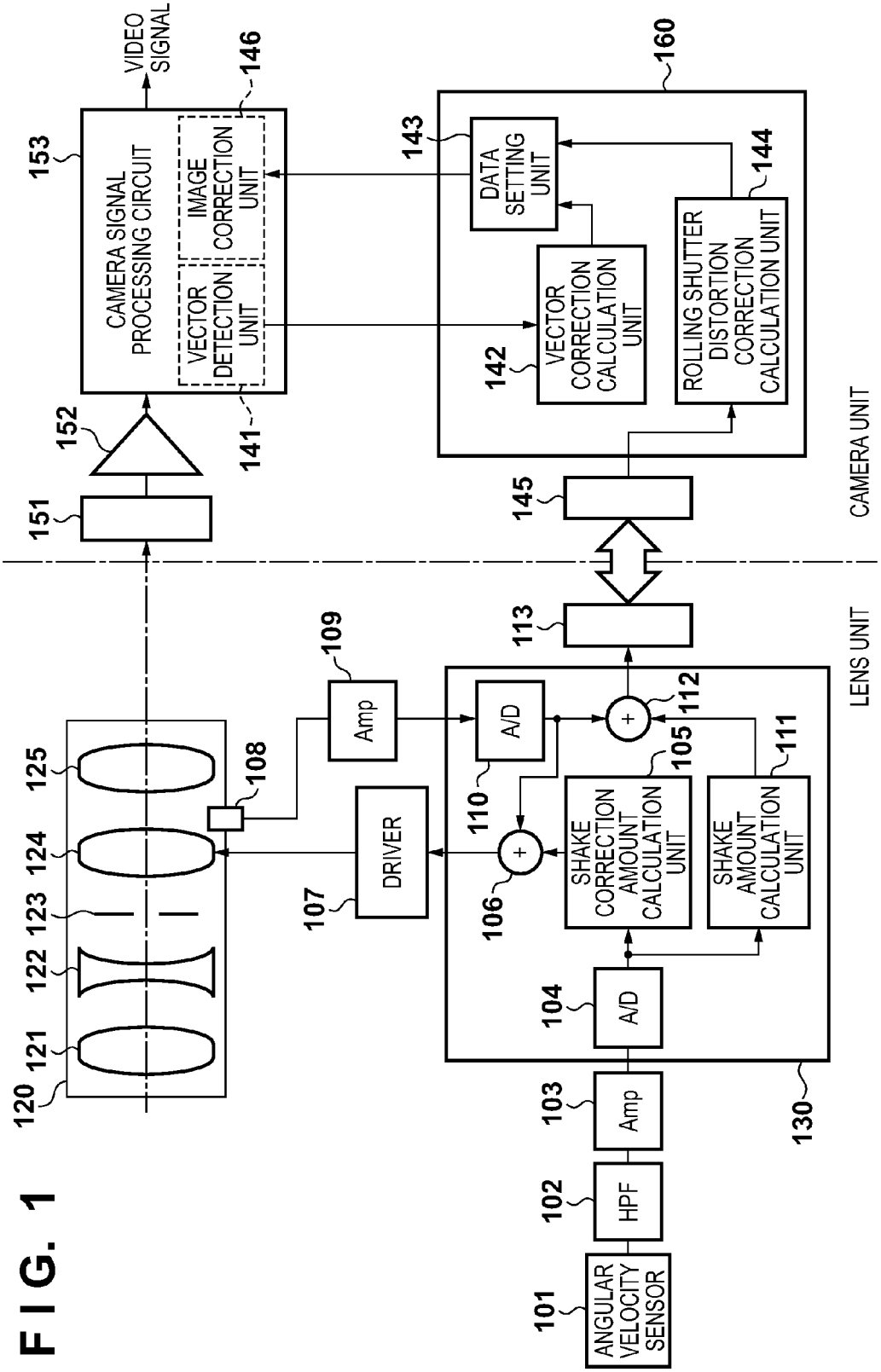
FIG. 1 is a view showing an image capture apparatus according to the first embodiment of the present invention.

FIG. 1 is a view showing a lens-detachable image capture apparatus (image capture system) according to the first embodiment of the present invention. In FIG. 1, components 101 to 130 build up a lens unit for forming an object image, and components 141 to 160 build up a camera unit for capturing an object image.

In the lens unit, the photographing lens 120 includes the fixed lens 121, the zoom lens 122 which performs a zooming operation, the stop 123 which controls the light quantity, the shift lens (correction member) 124 which performs a shake correction operation, and the focus position correction lens (to be referred to as a focus compensation lens hereinafter) 125 using focusing and zooming. The position sensor 108 is arranged in the lens. The position sensor is arranged for correction amount detection, and detects the position of the shift lens 124.

The shake detection sensor 101 is an angular velocity sensor such as a gyro sensor. The shake detection sensor 101 detects a camera shake and outputs it as a shake signal. The high-pass filter (to be referred to as a HPF hereinafter) 102 removes a drift component from the shake signal. The HPF 102 is not always an indispensable component. The amplifier 103 amplifies the shake signal. The driver 107 drives the shift lens 124. The amplifier 109 amplifies an output from the position detection sensor 108. The microcomputer (to be referred to as a lens microcomputer hereinafter) 130 is a microcomputer for controlling the lens system, and performs lens control.

Camera shake detection and image stabilization are performed along two orthogonal axes, such as the lateral direction (yaw direction) and longitudinal direction (pitch direction). However, an arrangement regarding camera shake detection and image stabilization is the same in both the two directions, and an arrangement for only one axis is typically described in the present invention. Although the lens microcomputer 130 controls the zoom lens 122, stop 123, and focus compensation lens 125, only a part regarding image stabilization control is described.

In the lens microcomputer 130, the A/D converter 104 converts a shake signal from an analog signal (shake signal) into a digital signal (gyro data), and loads the gyro data. The correction amount calculation unit 105 calculates a shake correction amount based on the input gyro data. An output from the correction amount calculation unit 105 is data having undergone necessary control such as panning control.

The A/D converter 110 is similar to the A/D converter 104. The A/D converter 110 receives an output from the position sensor amplifier 109. The adder 106 calculates a correction control amount by subtracting a shift lens position from the shake correction amount. A driving signal is sent to the shift lens driver 107 in accordance with an output from the adder 106, and then the shift lens 124 operates.

The shake amount calculation unit 111 calculates a shake amount from gyro data. To calculate the driving target value of the shift lens 124, the shake correction amount calculation unit 105 performs the above-mentioned panning control and the like so that the shift lens 124 does not collide against the mechanical end of a lens barrel. Thus, the correction amount calculation unit 105 does not always output a correction amount corresponding to a shake signal actually detected by the shake detection sensor 101. In contrast, the shake amount calculation unit 111 outputs an actual camera shake amount detected by the shake detection sensor 101. Similar to the adder 106, the adder 112 subtracts the position of the shift lens 124 from an output from the shake amount calculation unit 111, and outputs the residual amount of image stabilization by the shift lens 124 (difference extraction).

The contact 113 is an electrical contact which is arranged on the lens-side mount for a power line and serial communication line in order to connect the lens unit to the camera body. When the lens is mounted on the camera, the contact 113 is connected to the similar contact 145 arranged on the camera-side mount, thereby connecting the power line, ground (GND) line, and communication line.

In the camera unit, the contact 145 is a contact with the lens-side contact 113. The image sensor 151 is a CMOS sensor for image capturing (CMOS image sensor). The camera unit includes the analog signal processing circuit 152, the camera signal processing circuit 153, and the microcomputer 160 (to be referred to as a camera microcomputer hereinafter) for controlling the camera system.

The camera signal processing circuit 153 includes the vector detection unit 141 and image correction unit 146. The camera microcomputer 160 includes the vector correction calculation unit 142, data setting unit 143, and rolling shutter distortion correction calculation unit 144. The vector correction calculation unit 142 calculates vector-based correction data from vector data detected by the vector detection unit 141. The rolling shutter distortion correction calculation unit 144 in the camera microcomputer 160 calculates data for correcting a rolling shutter distortion. The data setting unit 143 creates and sets correction data to be corrected by the image correction unit 146 based on an output from the vector correction calculation unit 142 and an output from the rolling shutter distortion correction calculation unit 144.

When the lens unit and camera body are connected, the vector detection unit 141 detects a vector component corresponding to a residual shake after performing the image stabilization operation in the lens. The detected vector is sent (transferred) to the camera microcomputer 160. The vector correction calculation unit 142 calculates a correction amount based on the detected vector.

When communication between the lens and the camera starts upon connection to the lens, output data from the adder 112 is transmitted from the lens to the camera. This data corresponds to a residual blur amount serving as an image shake on the image sensing plane that remains upon image stabilization by the lens as a result of performing image stabilization by the shake correction unit of the lens. The rolling shutter distortion correction calculation unit 144 calculates a correction amount necessary for rolling shutter distortion correction by using the data corresponding to the residual blur amount received via the contact 145.

The data setting unit 143 sets, in the image correction unit 146, the image stabilization data calculated by the vector correction calculation unit 142, and the rolling shutter distortion correction data calculated by the rolling shutter distortion correction calculation unit 144. Then, correction of an image blur of a large amplitude that is generated when the user shoots while walking, and correction of a rolling shutter distortion are performed.

Figure 2:
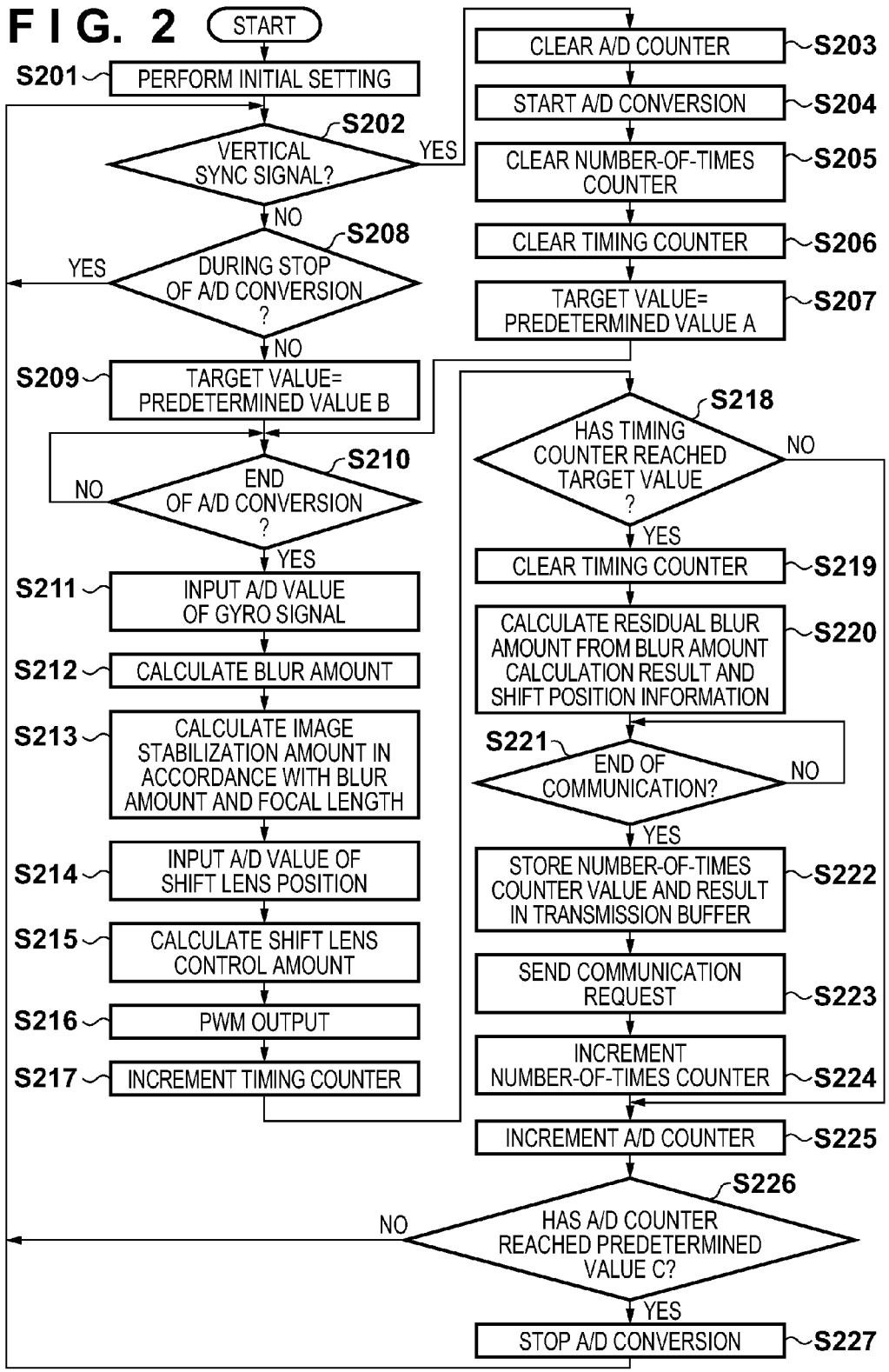
FIG. 2 is a flowchart showing control in a lens in the first embodiment.
Figure 3:
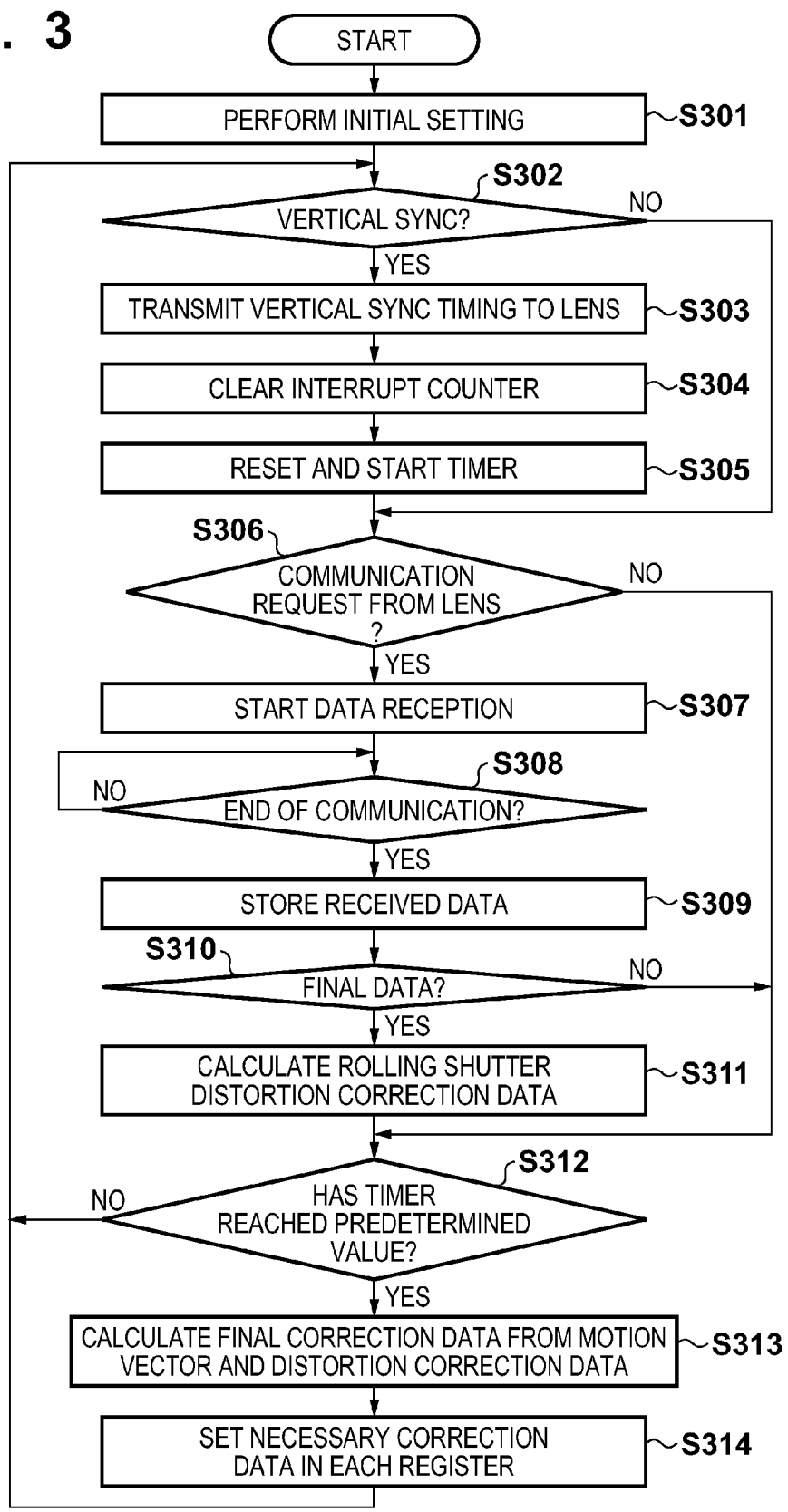
FIG. 3 is a flowchart showing control in a camera in the first embodiment.
Figure 4:
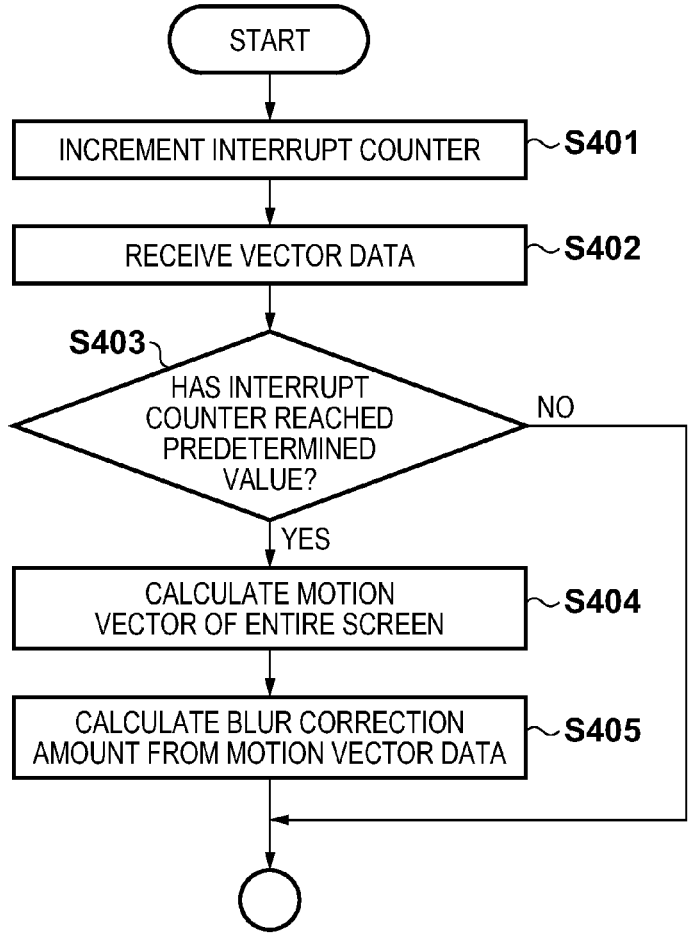
FIG. 4 is a flowchart showing a vector interrupt in the camera in the first embodiment.

FIG. 2 is a flowchart showing processing regarding image stabilization at the time of movie shooting in the lens microcomputer 130. FIGS. 3 and 4 are flowcharts showing processing regarding shake correction at the time of movie shooting in the camera microcomputer 160. The first embodiment of the present invention will be explained in detail with reference to FIGS. 1 to 4.

First, an operation in the lens microcomputer 130 will be described with reference to FIG. 2. When the lens is mounted on the camera, power is supplied from the camera body to the lens, and the operation of the lens microcomputer 130 starts. In FIG. 2, step S201 is an initial setting step. In step S201, the lens microcomputer 130 performs initial communication with the camera microcomputer 160. By this initial communication, the lens microcomputer 130 transmits the lens magnification, full-aperture f-value, defocus information, and the like to the camera microcomputer 160. Also, initial setting of the A/D conversion cycle and the like in the lens microcomputer 130 is performed.

In step S202, the lens microcomputer 130 checks whether a video vertical sync signal (to be referred to as vertical synchronization hereinafter) has been input. Basic intercommunication between the camera and the lens (not shown: communication necessary for control other than shake correction, for example, communication for focus compensation lens control data from the camera to the lens, and focal length information from the lens to the camera) is performed a plurality of times during the vertical sync period. Communication with the camera starts in response to a request signal from the camera. The communication data includes a vertical sync signal, and the vertical sync timing can be determined by confirming corresponding data. At the vertical sync timing, the lens microcomputer 130 clears an A/D counter in step S203. In step S204, the lens microcomputer 130 starts A/D conversion. In step S205, the lens microcomputer 130 clears a number-of-times counter that counts the number of times residual blur data is sent. In step S206, the lens microcomputer 130 clears a timing counter for transmitting residual blur data to the camera. In step S207, the lens microcomputer 130 sets the target value of the timing counter to a predetermined value A.

If it is determined in step S202 that the vertical sync timing has not come, the lens microcomputer 130 determines in step S208 whether A/D conversion is stopped. If A/D conversion has been performed a necessary number of times during the V period, it is stopped. In this case, the process returns to step S202, and the lens microcomputer 130 shifts to the vertical sync standby state. If A/D conversion is not stopped, the lens microcomputer 130 sets the target value of the timing counter to a predetermined value B in step S209. The predetermined value B and the above-mentioned predetermined value A will be described later.

In step S210, the lens microcomputer 130 determines whether the A/D conversion has ended. If the A/D conversion has ended, the lens microcomputer 130 reads the A/D conversion value of the gyro signal in step S211. In step S212, the lens microcomputer 130 calculates a blur amount based on the read gyro signal. In step S213, the lens microcomputer 130 performs panning control, limiter control, and the like in accordance with the blur amount calculated in step S212. Also, the lens microcomputer 130 calculates a final image stabilization amount from shift lens correction sensitivity information corresponding to the focal length.

In step S214, the lens microcomputer 130 reads the result of A/D-converting an output from the position sensor amplifier 109 for the shift lens 124. In step S215, the lens microcomputer 130 calculates an actual shift lens control amount from the difference between the image stabilization amount calculated in step S213 and the shift lens position read in step S214 (FIG. 1, 106). In step S216, the lens microcomputer 130 PWM-outputs the calculation result in step S215. In step S217, the lens microcomputer 130 increments the timing counter.

In step S218, the lens microcomputer 130 determines whether the timing counter incremented by one in step S217 has reached a predetermined value. If the counter has not reached the predetermined value, the process advances to step S225. If it is determined in step S218 that the counter has reached the predetermined value, the timing to calculate a residual blur amount to be sent to the camera body has come, and the lens microcomputer 130 clears the timing counter in step S219.

In step S220, the lens microcomputer 130 calculates a residual blur amount by converting the shift lens position read in step S214 into an actual image stabilization amount from sensitivity information of the shift lens 124, and subtracting the actual image stabilization amount from the blur amount calculated in step S212 (FIG. 1, 112). In step S221, the lens microcomputer 130 checks whether communication with the camera in regard to image stabilization has ended, and waits till the end of the communication. If the communication has ended, in step S222 the lens microcomputer 130 stores, in a transmission buffer, the current number-of-times counter value representing the number of times by which the residual blur amount has been transmitted to the camera during the vertical sync period, and the residual blur data calculated in step S220. In step S223, the lens microcomputer 130 sends a communication request to the camera. In response to this request signal, the camera and lens start serial communication using the camera as a master. In step S224, the lens microcomputer 130 increments the number-of-times counter by one.

In step S225, the lens microcomputer 130 increments the A/D counter. In step S226, the lens microcomputer 130 determines whether the A/D counter has reached a predetermined value, that is, whether the A/D conversion has ended a necessary number of times during the vertical sync period. If the A/D counter has not reached the predetermined value, the process returns to step S202 without performing anything. If the A/D counter has reached the predetermined value, the lens microcomputer 130 stops the A/D conversion in step S227, and then the process returns to step S202.

By the above-described operation, a residual blur signal is transmitted from the lens to the camera a plurality of times equally at a predetermined interval during the vertical sync period.

Next, an operation in the camera will be explained with reference to FIGS. 3 and 4.

In FIG. 3, step S301 is a step of performing initial setting upon power-on. In step S302, the camera microcomputer 160 determines whether a vertical synchronization timing has come. If the vertical sync timing has come, the camera microcomputer 160 transmits a vertical sync signal to the lens in step S303. In step S304, the camera microcomputer 160 resets an interrupt counter. In step S305, the camera microcomputer 160 restarts the timer. If it is determined in step S302 that the vertical sync timing has not come, the operations in steps S303 to S305 are skipped.

Step S306 is a step of confirming whether a communication request has been received from the lens. If no request has been received, the process advances to step S312. If it is determined in step S306 that the communication request has been received from the lens, the process advances to step S307. In step S307, the camera microcomputer 160 starts data reception in accordance with the request. In step S308, the camera microcomputer 160 waits until all necessary pieces of lens information have been received. After the end of the reception, the process advances to step S309, and the camera microcomputer 160 stores the received data in a RAM (not shown) in the camera microcomputer 160 in step S309. Then, in step S310, the camera microcomputer 160 determines whether the received data is the final data during the vertical sync period. The state in which the received data is determined to be the final data is a state in which all residual blur data in the vertical sync period transmitted from the lens for use in rolling shutter distortion correction have been received.

If the received data is not the final data, the process advances to step S312. If the data received by the camera microcomputer 160 is the final data, the rolling shutter distortion correction calculation unit 144 calculates data necessary for rolling shutter distortion correction by using all the residual blur data received during the vertical sync period in step S311. In step S312, the camera microcomputer 160 determines whether the timer has reached a predetermined value. The predetermined value is almost the end timing of the vertical sync period, and is the timing when vector correction calculation in the vector correction calculation unit 142 has ended.

Figure 6:
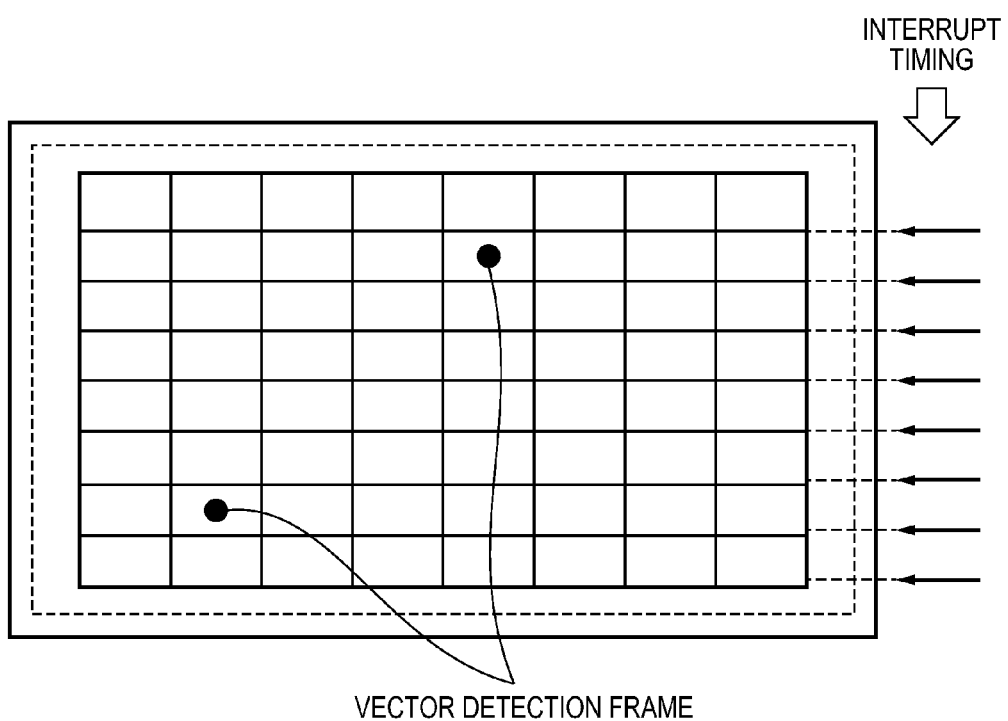
FIG. 6 is a view exemplifying a vector detection frame.

A sequence regarding vector correction calculation will be explained. FIG. 4 shows a sequence in the camera microcomputer 160 when a vector detection interrupt has occurred. The screen is divided into frames, and vector detection is performed for each divided frame. FIG. 6 exemplifies a vector detection frame. In this case, the screen is divided into 8×8 vector detection frames. An interrupt occurs every time vector detection is performed in eight horizontal frames. That is, for the division as shown in FIG. 6, eight interrupts occur during the vertical sync period.

In step S401 of FIG. 4, the camera microcomputer 160 increments a vector detection interrupt counter. The interrupt counter is reset in step S304 described above. By checking the value of the interrupt counter, the interrupt timing during the vertical sync period can be determined.

Step S402 is a step of storing a vector detection result, and vector detection data of eight horizontal frames are stored.

In step S403, the camera microcomputer 160 determines whether the interrupt counter has reached a predetermined value. In the embodiment, eight vector detection interrupts occur during the vertical sync period, as described above. Hence, it is determined whether the counter has reached eight. If the counter has not reached eight, the interrupt routine ends without performing anything. Every time an interrupt occurs, vector data of new frames are sequentially stored until the interrupt counter reaches eight. If the interrupt counter has reached eight, vector data in all the frames shown in FIG. 6, that is, vector data of one screen have been obtained. At this time, the process advances to step S404. In step S404, the camera microcomputer 160 calculates a final screen motion vector from the 64 detected vector data. In step S405, the vector correction calculation unit 142 in the camera microcomputer 160 calculates, from the motion vector calculated in step S404, correction data for correcting a blur.

Referring back to FIG. 3, in step S313, the data setting unit 143 calculates a final correction amount from the vector correction amount calculated according to the flow shown in FIG. 4, and the rolling shutter distortion correction amount calculated in step S311. In step S314, necessary correction data calculated in step S313 is set in each register of the image correction unit 146 in the camera signal processing circuit 153, and then the process returns to step S302. The image correction unit 146 performs residual blur correction and rolling shutter distortion correction by using the correction data set in step S314.

Figure 5:
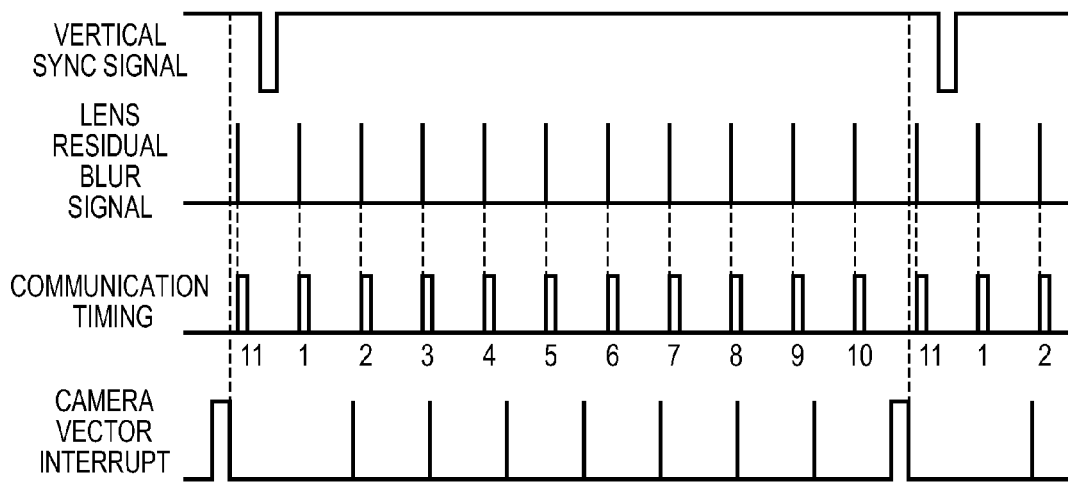
FIG. 5 is a timing chart showing a control timing in the vertical sync period in the first embodiment.

FIG. 5 is a timing chart showing the control timing in the embodiment. The vertical sync signal serves as a starting point, and predetermined processing is performed during the vertical sync period. The number of times of processing to be performed during the vertical sync period in the embodiment is 1,200 for A/D conversion to be performed in the lens microcomputer 130, 11 (timing of extraction a plurality of times) for residual blur data calculation to be performed for rolling shutter distortion correction, and eight for vector detection processing to be performed in the camera microcomputer 160. The data calculation timing for rolling shutter distortion correction is decided from the number of times of A/D conversion. The number-of-times counter for A/D conversion is synchronized with V and is reset at the vertical sync timing. The A/D count value of the data calculation timing for the first A/D conversion is different for that of the timings of the second and subsequent A/D conversions. For this reason, the target value of the timing counter for the first A/D conversion is set to the predetermined value A, and the target value of the timing counter for the second and subsequent A/D conversions is set to the predetermined value B.

The rolling shutter distortion correction method has conventionally been proposed, so details thereof will be omitted here. However, for example, when a shake signal such as a gyro output is used, the shake signal is detected a plurality of times during the vertical sync period, and the detected shake signals are further compensated to calculate correction data for an image shake of each line. The correction data is composited with a shift of the CMOS sensor-specific accumulation time to derive rolling shutter distortion correction data, and distortion correction is performed using this data.

To the contrary, according to the embodiment, correction data is created using a plurality of residual blur signals, instead of the plurality of blur signals. According to this method, when electronic correction is further performed in the camera body even in a system in which the image stabilization mechanism is mounted in the interchangeable lens and a video having already undergone image stabilization is captured in the camera body, a rolling shutter distortion caused by the electronic correction can be corrected.

As described above, a rolling shutter distortion can be corrected by transmitting a residual blur signal from the lens to the camera. A wobbling, unnatural distortion of an image arising from a rolling shutter distortion generated when image stabilization is performed based on segmentation in the camera body can be corrected. Even a large blur generated when the user shoots while walking on the wide angle side can be corrected satisfactorily.

Second Embodiment

The second embodiment of the present invention will be described.

Figure 7:
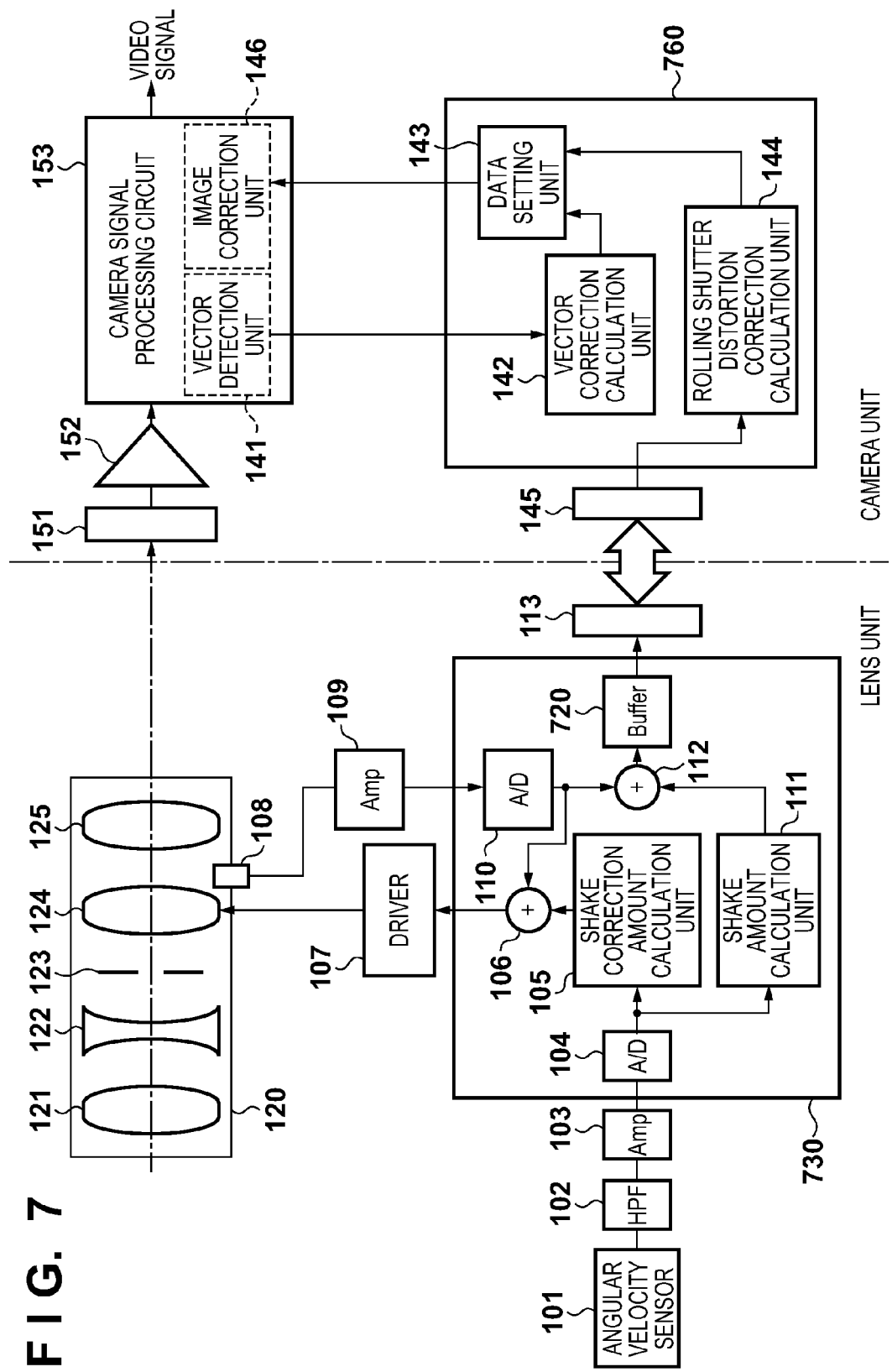
FIG. 7 is a view showing an image capture apparatus according to the second embodiment of the present invention.

FIG. 7 is a view showing an image capture apparatus according to the second embodiment of the present invention. The same reference numerals as those in FIG. 1 denote blocks having the same functions, and a description thereof will not be repeated. In FIG. 7, the image capture apparatus according to the second embodiment includes a lens microcomputer 730 and camera microcomputer 760. A buffer memory 720 is arranged in the lens microcomputer 730, and stores residual blur amounts calculated a plurality of times at predetermined timings during the vertical sync period.

Figure 8:
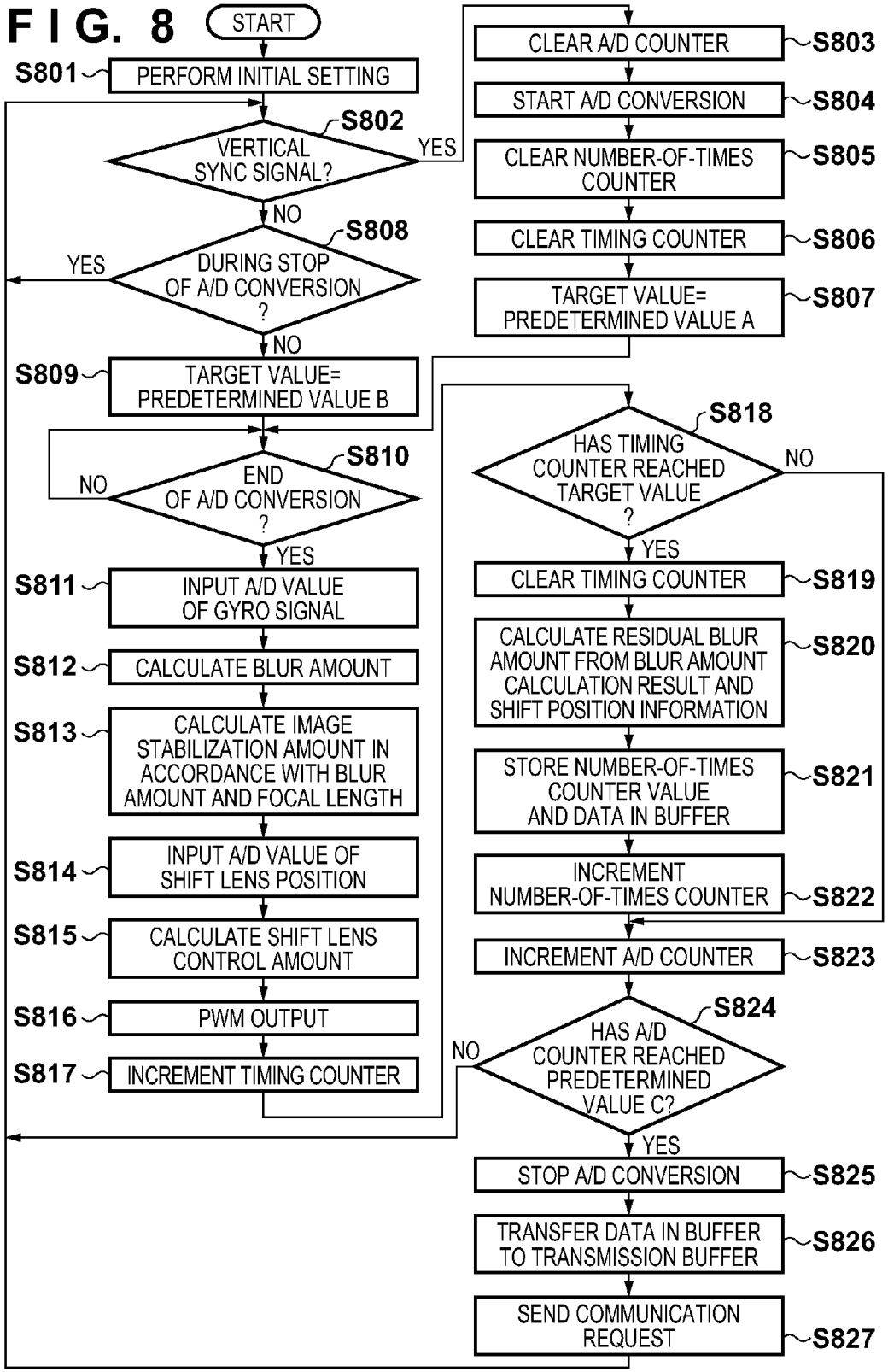
FIG. 8 is a flowchart showing control in a lens in the second embodiment.
Figure 9:
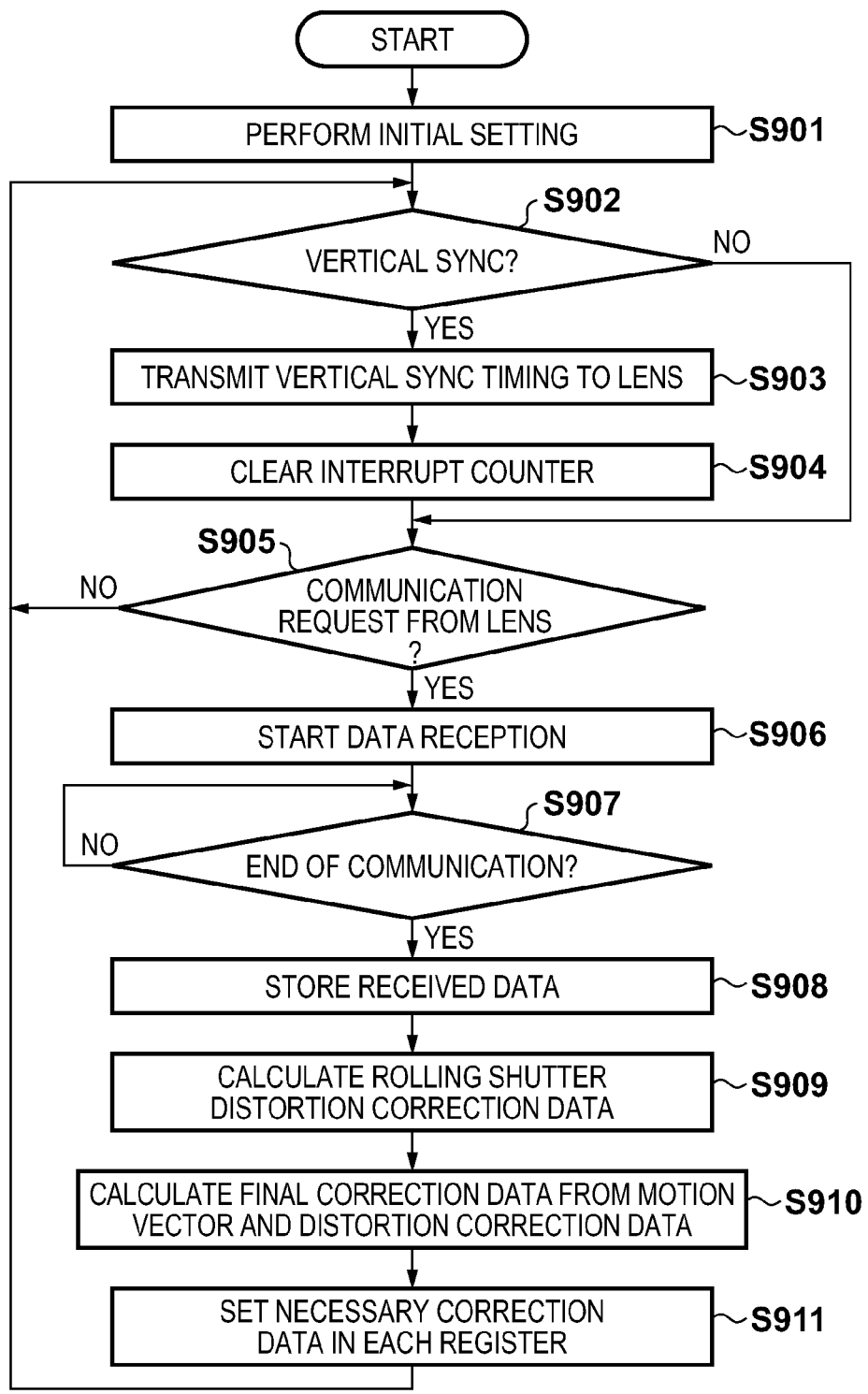
FIG. 9 is a flowchart showing control in a camera in the second embodiment.

FIG. 8 is a flowchart showing an internal operation in the lens control microcomputer 730 in the second embodiment. FIG. 9 is a flowchart showing an internal operation in the camera control microcomputer 760. The second embodiment will be described in detail with reference to FIGS. 8 and 9.

First, processing to be executed by the lens microcomputer 730 will be explained with reference to FIG. 8. In FIG. 8, the processing contents of steps S801 to S820 are the same as those of steps S201 to S220 in FIG. 2, and a description thereof will not be repeated. In step S821, the lens microcomputer 730 stores a number-of-times counter and residual blur data in the buffer 720. In step S822, the lens microcomputer 730 increments the number-of-times counter. In step S823, the lens microcomputer 730 increments an A/D counter. In step S824, the lens microcomputer 730 checks whether the A/D counter value is equal to a predetermined value C. If the A/D counter value is different from the predetermined value C, the process returns to step S802, and the lens microcomputer 730 continues processing in the vertical sync period. If it is determined in step S824 that the A/D counter value is equal to the predetermined value C, the lens microcomputer 730 determines that pieces of residual blur information have been acquired a necessary number of times. The lens microcomputer 730 stops the A/D conversion in step S825, and transfers the data stored in the buffer 720 to a transmission buffer in step S826 in order to transmit the data to the camera. In step S827, the lens microcomputer 730 issues a communication request to the camera (camera microcomputer 760) to start communication with the camera. Accordingly, the lens microcomputer 730 transmits residual blur data to the camera microcomputer 760.

Next, processing in the camera microcomputer 760 will be explained with reference to FIG. 9. Also in this case, the processes of steps S901 to S904 in FIG. 9 are the same as those of steps S301 to S304 in FIG. 3, and a description thereof will not be repeated. In step S905, the camera microcomputer 760 checks whether a communication request has been received from the lens. If no communication request has been received, vector interrupt processing is performed while repeating steps S902 to S905. The contents of the vector interrupt processing are completely the same as those described with reference to FIG. 4, and a description thereof will not be repeated.

If a communication request has been received from the lens, the camera microcomputer 760 receives data in step S906. In step S907, the camera microcomputer 760 waits till the end of the communication. In step S908, the camera microcomputer 760 stores the data received from the lens microcomputer 730. In step S909, a rolling shutter correction calculation unit 144 in the camera microcomputer 760 calculates rolling shutter distortion correction data by using the data stored in step S908.

In step S910, a data setting unit 143 calculates final correction data for correction by an image correction unit 146, from motion correction data calculated in accordance with a vector interrupt and the rolling shutter distortion correction data calculated in step S909. In step S911, the data setting unit 143 sets the calculated correction data in a register in the image correction unit 146.

FIG. 10 is a timing chart showing the communication timing in the second embodiment. A difference from the timing chart (FIG. 5) of the first embodiment is that communication is performed only once at a timing immediately after the final control timing regarding image stabilization during the vertical sync period. In the second embodiment, all data stored in the buffer 720 are transmitted from the lens microcomputer 730 to the camera microcomputer 760 at this timing. The lens and camera can therefore communicate with each other without cumbersome processing caused by frequent communication. As is apparent from FIG. 10, all processes triggered by a vector interrupt in the vertical sync period have ended at the end of the communication. Thus, calculation of all correction data can start at the same time as the end of the communication. In the camera microcomputer 760, the rolling shutter correction calculation unit 144 calculates data necessary for rolling shutter distortion correction by using these received data. The data setting unit 143 sets the correction data in the image correction unit 146. As a result, a rolling shutter distortion can be corrected, similar to the first embodiment. A wobbling, unnatural distortion of an image arising from a rolling shutter distortion generated when image stabilization is performed based on segmentation in the camera body can be corrected.

In the second embodiment, communication is performed only once in the vertical sync period. However, communication may be performed a plurality of times smaller than the number of times of data reception as long as the final communication timing in the vertical sync period is immediately after the final control timing regarding image stabilization. Processing can be executed smoothly by making the number of times of communication match the processing loads of the lens microcomputer 730 and camera microcomputer 760.

Third Embodiment

The third embodiment of the present invention will be described. In the first and second embodiments, a rolling shutter distortion is corrected by transmitting image stabilization data calculated in the lens to the camera. However, in the third embodiment, a gyro signal and correction lens position information are transmitted from the lens to the camera, and a residual blur is calculated in the camera body and used for rolling shutter distortion correction.

Figure 11:
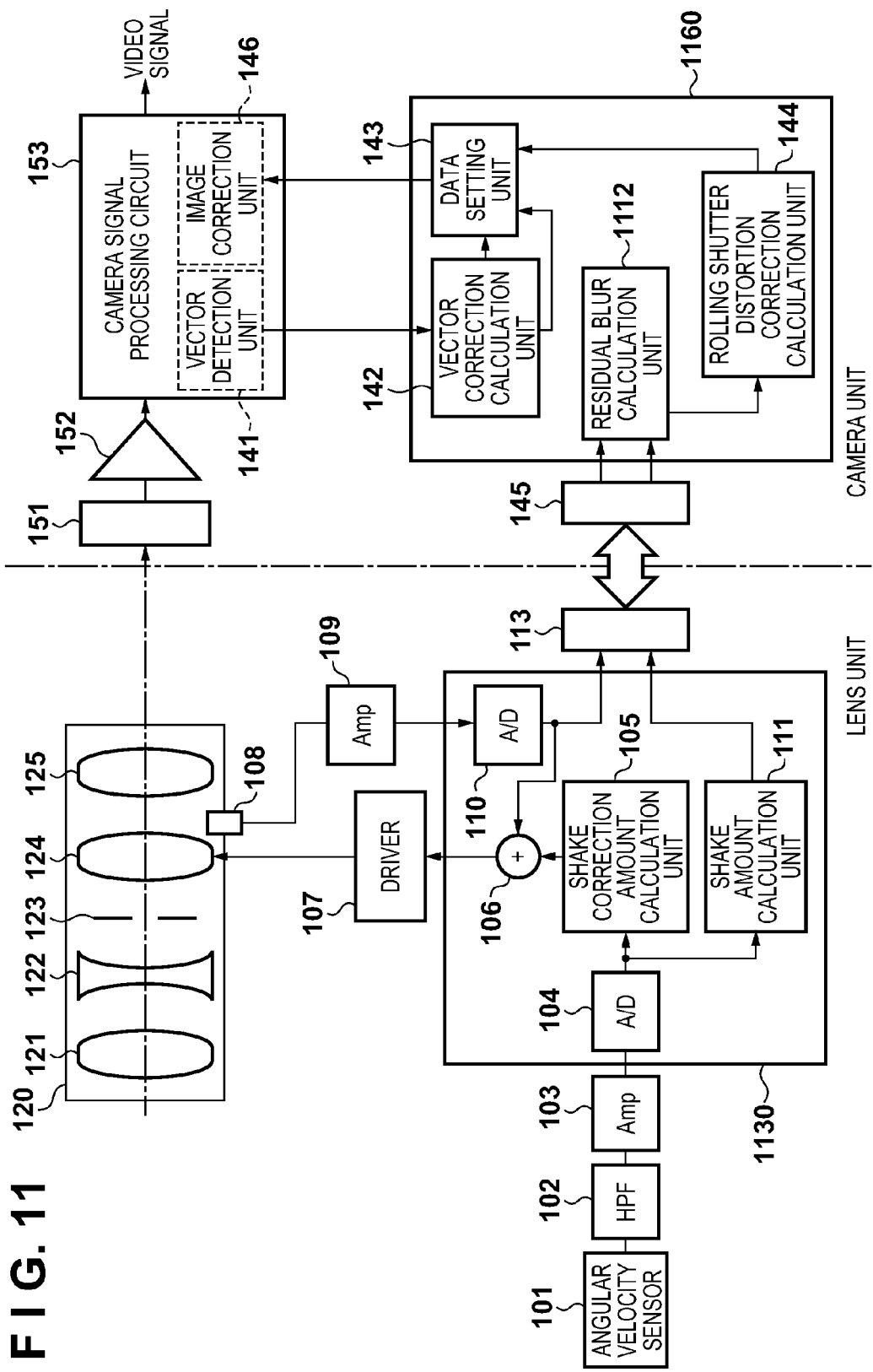
FIG. 11 is a view showing an image capture apparatus according to the third embodiment of the present invention.

FIG. 11 is a view showing an image capture apparatus according to the third embodiment of the present invention. The arrangement is the same as that in the first embodiment, the same reference numerals as those in FIG. 1 denote blocks having the same functions, and a description thereof will not be repeated.

In FIG. 11, the image capture apparatus according to the third embodiment includes a lens microcomputer 1130 and camera microcomputer 1160. The lens microcomputer 1130 transmits, to the camera microcomputer 1160 via a lens mount contact 113 and camera mount contact 145, an output which is input from a sensor amplifier 109 to an A/D converter 110. Similarly, the lens microcomputer 1130 transmits an output from a shake amount calculation unit 111 to the camera microcomputer 1160 via the lens mount contact 113 and camera mount contact 145. In the camera microcomputer 1160, a residual blur calculation unit 1112 calculates residual blur data from blur amount data and lens position data received from the lens, that is, an image stabilization residue amount by subtracting a correction amount by a shift lens 124 from the actual blur amount of the body. This residual blur data is used for rolling shutter correction.

In the third embodiment, the residual blur calculation unit is arranged not in the lens microcomputer but in the camera microcomputer, unlike the first embodiment. Data calculation in a rolling shutter distortion correction unit in the camera microcomputer 1160 is the same as that in the first embodiment.

In the third embodiment, the communication amount increases because two types of signals, that is, a blur signal and a signal regarding an image stabilization amount are transmitted. However, the residual blur amount need not be calculated in the lens microcomputer, so the lens microcomputer can be downsized.

Note that data may be transmitted from the lens microcomputer to the camera microcomputer at each predetermined sampling timing or at once at the end of the vertical sync period.

As described above, in a lens-interchangeable image capture apparatus, an output from a blur detection means such as a gyro sensor mounted in the lens, and an amount of correction by the image stabilization function arranged in the lens are transmitted to the camera body, and a rolling shutter distortion can be corrected using these signals. As a result, even in a lens-interchangeable camera system in which the lens incorporates the image stabilization mechanism, even a large blur generated during walking can be corrected by performing electronic image stabilization simultaneously in the camera body. In addition, a wobbling unnatural distortion of a captured image that is generated by the CMOS sensor can be prevented, providing a high-quality video.

Fourth Embodiment

The fourth embodiment of the present invention will be described. The fourth embodiment exemplifies a case in which a shake detection sensor (gyro sensor) is also mounted in the camera. In a lens-interchangeable system, most lenses do not incorporate the image stabilization function. For example, when the focal length is short, a camera shake does not influence a captured image. Generally in this case, the image stabilization function is omitted to reduce the cost. However, most recent cameras have the movie shooting function, and it is desirable to perform image stabilization when the user shoots while walking or the like. Thus, the shake detection sensor (gyro sensor) is mounted in the camera body, and electronic image stabilization is performed in the camera to enable image stabilization even in a lens having no image stabilization function. The image stabilization effect can be obtained not only on the wide angle side but on the telephoto side though the correctable amount is small.

In the use of this camera, rolling shutter distortion correction when a lens having no image stabilization function is mounted and electronic image stabilization is performed is executed by the same method as the conventional one. Even when a lens having the image stabilization function is used, the image stabilization function in the lens is disabled, image stabilization is performed in the camera body, and thus image stabilization when the user shoots while walking becomes possible by the same control as that for a lens having no image stabilization function. However, considering the image quality, optical correction does not degrade the image quality, unlike electronic correction. Further, a lens having the image stabilization effect generally has a long focal length. In electronic correction, as the focal length becomes longer, the correctable range becomes smaller, and optical correction in the lens is indispensable particularly on the telephoto side. It is therefore desirable to enable the correction function in the lens for a combination of a camera in which the gyro sensor is mounted in the camera body, and a lens having the image stabilization function.

Figure 12:
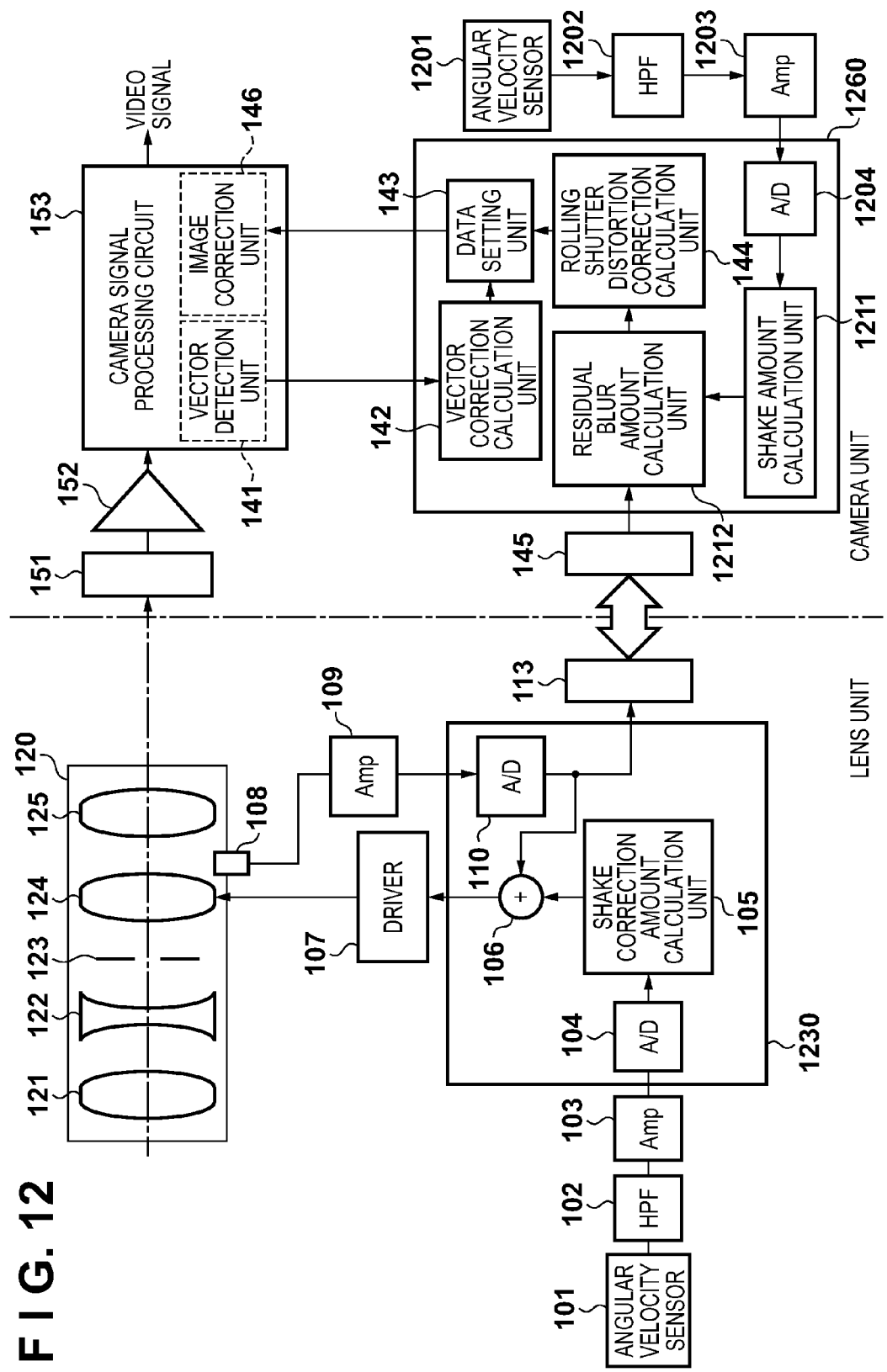
FIG. 12 is a view showing an image capture apparatus according to the fourth embodiment of the present invention.

FIG. 12 is a view showing an image capture apparatus according to the fourth embodiment of the present invention. FIG. 12 shows an arrangement optimum for a case in which a gyro sensor-mounted camera is combined with a lens having the image stabilization function. In FIG. 12, the same reference numerals as those in FIG. 1 showing the first embodiment denote the same parts, and a description thereof will not be repeated. A difference from FIG. 1 will be explained.

In FIG. 12, the image capture apparatus according to the fourth embodiment includes a lens microcomputer 1230. A shake detection sensor 1201 is, for example, a gyro sensor mounted in the camera body. A detected shake signal is input to a camera microcomputer 1260 via a high-pass filter (HPF) 1202 and amplifier 1203. A camera shake is detected in two orthogonal directions such as the lateral direction (yaw direction) and longitudinal direction (pitch direction), as described above. However, arrangements are the same, and an arrangement for only one axis is described, similar to the shake detection unit in the lens. In the camera microcomputer 1260, an A/D converter 1204 receives a shake signal and converts it from an analog signal into a digital signal. A shake amount calculation unit 1211 calculates the shake amount of a camera caused by a camera shake. A residual blur amount calculation unit 1212 calculates a residual blur amount necessary for rolling shutter distortion correction. The residual blur amount calculation unit 1212 calculates a residual blur amount by converting position information of a shift lens 124, which has been transmitted from the lens microcomputer 1230, into an actual correction amount by using focal length information obtained by separately executed communication with the lens microcomputer 1230.

In the first embodiment, the residual blur is calculated in the lens microcomputer and transmitted to the camera microcomputer. In the fourth embodiment, only the normal image stabilization operation is performed in the lens and the moving amount of the shift lens 124 is transmitted to the camera microcomputer. A camera shake is also detected in the camera, and the residual blur amount calculation unit 1212 calculates a residual blur amount from a shake amount calculated by the shake amount calculation unit 1211 in the camera microcomputer 1260, and the position of the shift lens 124 that has been received from the lens. By using the calculated residual blur amount, a rolling shutter correction calculation unit 144 calculates data for correcting a rolling shutter distortion. The rolling shutter distortion correction amount is set in an image correction unit 146 via a data setting unit 143 together with an image stabilization amount corresponding to a vector detected by a vector detection unit 141. Hence, a rolling shutter distortion generated by electronic correction can be appropriately corrected. Even when electronic image stabilization is performed in the camera, a high-quality video can be provided without generating a wobbling, unnatural image distortion. The arrangement shown in FIG. 12 can reduce the processing load in the lens microcomputer, and can also reduce the communication data amount with the camera microcomputer during one vertical sync period.

As the communication timing from the lens to the camera in the fourth embodiment, data may be transmitted at each predetermined timing, as described in the first embodiment. Similar to the second embodiment, lens position information may be stored in the buffer and communicated at an arbitrary timing in the vertical sync period.

In accordance with the focal length of the lens, image stabilization may be performed only in the camera on the wide angle side, similar to image stabilization executed when a lens having no image stabilization function is mounted, and image stabilization as a combination of the image stabilization function in the lens and the electronic image stabilization in the camera may be performed on the telephoto side. In this case, a signal used for rolling shutter distortion correction is switched in accordance with the respective control operations. On the wide angle side, the control can be simplified while coping with a large shake generated when the user shoots while walking. On the telephoto side, the image stabilization effect can be further enhanced by attaching importance to the camera shake function and enlarging the correction angle.

Fifth Embodiment

The fifth embodiment of the present invention will be described. The sampling timing of rolling shutter distortion correction data that maximizes the rolling shutter distortion correction effect is set at the center position of the exposure period for each line. Considering this, the fifth embodiment changes the sampling timing of residual blur data in accordance with the exposure period.

Figure 13:
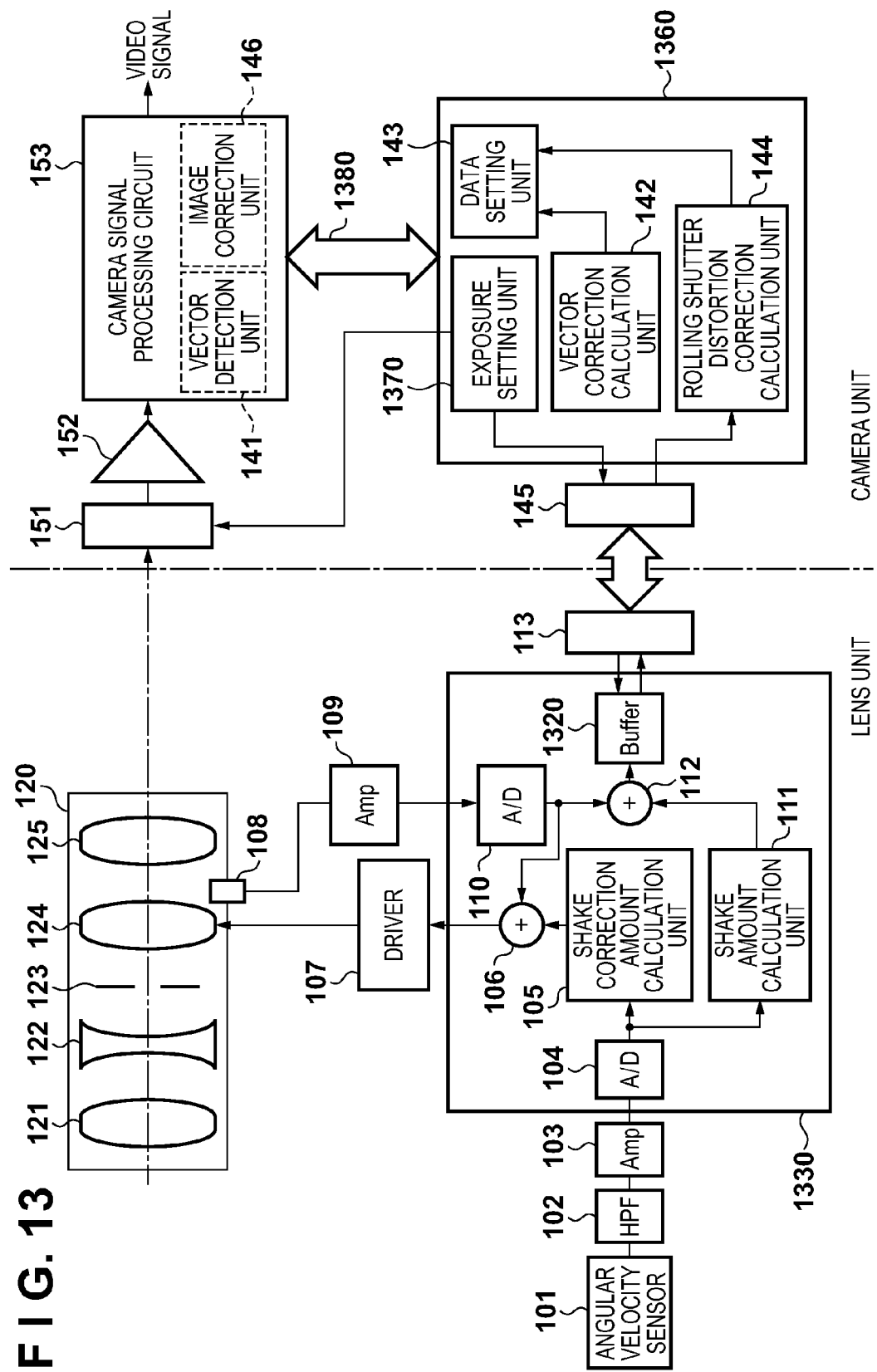
FIG. 13 is a view showing an image capture apparatus according to the fifth embodiment of the present invention.

FIG. 13 is a view showing an image capture apparatus according to the fifth embodiment of the present invention. The same reference numerals as those in FIG. 1 denote blocks having the same functions, and a description thereof will not be repeated. In FIG. 13, the microcomputers of the image capture apparatus according to the fifth embodiment are a lens microcomputer 1330 and camera microcomputer 1360. A buffer memory 1320 stores residual blur amounts calculated a plurality of times at predetermined timings during the vertical sync period, similar to the second embodiment.

An exposure setting unit 1370 decides the exposure values (exposure time and f-number) of the camera from video signal information of a camera signal processing circuit 153, and sets them. The exposure setting unit (exposure time setting unit) 1370 sends stop control information of the decided exposure information to the lens unit by basic intercommunication, causes the lens unit to perform stop control, and controls the exposure time of the image sensor via an image sensor driver (not shown). The exposure setting unit 1370 also transmits the exposure time information to the lens microcomputer 1330. A bus line 1380 performs data delivery from a vector detection unit 141 to a vector correction calculation unit 142 between the camera signal processing circuit 153 and the camera microcomputer 1360. Further, the bus line 1380 performs data delivery from a data setting unit 143 to an image correction unit 146, and data delivery between the camera signal processing circuit 153 and the exposure setting unit 1370.

As described above, the lens microcomputer 1330 extracts data (data corresponding to the center of the exposure period) that can maximize the rolling shutter distortion correction effect, from a detected residual blur amount (output from an adder 112) by using the exposure time information transmitted from the camera microcomputer 1360, and stores the extracted data in the buffer 1320. Then, the lens microcomputer 1330 transmits the data to the camera microcomputer 1360.

An operation in the camera microcomputer 1360 regarding rolling shutter distortion correction in the fifth embodiment is almost the same as that in FIG. 9. A difference of the operation of the camera microcomputer 1360 from FIG. 9 is that the exposure time (shutter speed) is also transmitted simultaneously when transmitting the vertical sync timing to the lens microcomputer 1330. In the lens microcomputer 1330, data of a necessary timing is extracted from residual blur data in accordance with the exposure time information.

Figure 14:
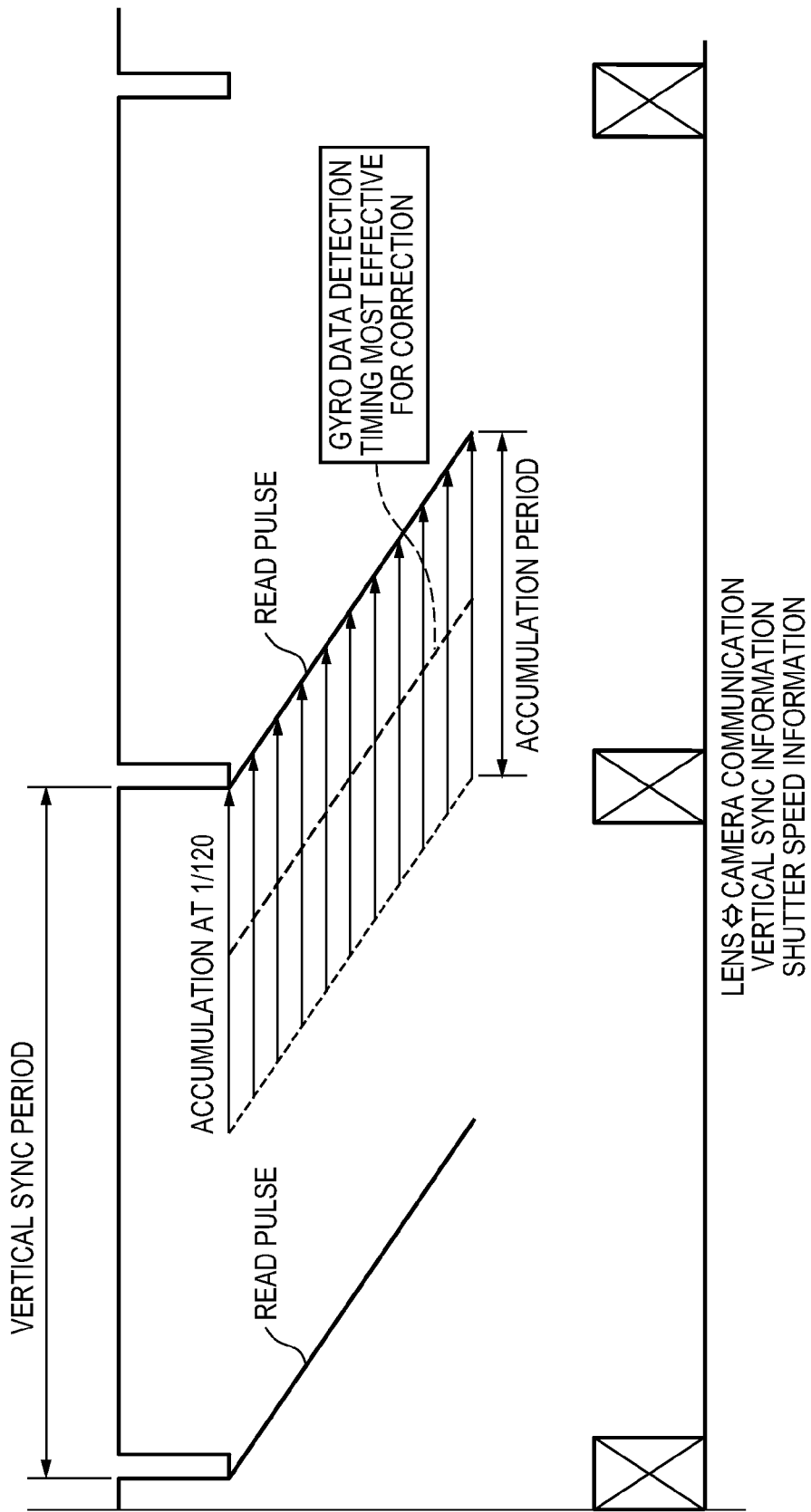
FIG. 14 is a timing chart showing a residual blur data detection timing.

FIG. 14 is a timing chart showing an optimum residual blur data detection timing when the exposure time (shutter speed) in the vertical sync period is set to 1/120 sec in correcting a rolling shutter distortion correction by the NTSC method. A/D conversion of a gyro signal and shift lens position is performed 12,000 times in the vertical sync period, and sampling is performed about 22 times in the horizontal sync period for full-HD interlace. It is therefore set to be able to select data at timings closest to ideal timings for lines corresponding to respective data for rolling shutter distortion correction required 11 times in the vertical sync period shown in FIG. 14. For example, an A/D conversion count for acquiring residual blur data is created as table data, and data corresponding to the exposure time (shutter speed) is read out from the table data.

FIG. 15 is a table showing the ordinal number of A/D conversion counted from the beginning of the vertical sync period in which each residual blur data necessary for rolling shutter distortion correction in the vertical sync period is sampled in accordance with the shutter speed. In FIG. 15, Sample No. is the time-series number of data to be acquired in one vertical sync period (1 V). Sample No. represents A/D conversion counts corresponding to typical shutter speeds of 1/60 to 1/500. For an intermediate shutter speed, an A/D conversion count is used after interpolation. For example, when the shutter speed is 1/250 sec, residual blur data for rolling shutter distortion correction corresponding to the sixth A/D conversion upon receiving a vertical sync signal can be residual blur data calculated when the 10508th A/D conversion was performed.

FIGS. 16A and 16B are flowcharts showing an operation in the lens microcomputer 1330. The above-described operation will be explained with reference to FIGS. 16A and 16B. In FIGS. 16A and 16B, steps S1601 and S1602 are the same processes as steps S801 and S802 in FIG. 8, and a detailed description thereof will be omitted. When a vertical sync signal is input, the lens microcomputer 1330 initializes a counter for counting the number of times (11 in this embodiment) of sampling necessary for rolling shutter distortion correction during one vertical sync period in step S1603. In step S1604, the lens microcomputer 1330 sets the target value of the A/D conversion counter. This target value represents the first sampling time necessary for rolling shutter distortion correction, and is a value corresponding to a shutter speed for Sample No.=1 in the table shown in FIG. 15. In step S1605, the lens microcomputer 1330 starts A/D conversion. If no vertical sync signal is input, the lens microcomputer 1330 checks in step S1606 whether A/D conversion has been stopped. In general, the A/D conversion cycle is set to a cycle which equally divides the vertical sync period. When A/D conversion is performed a predetermined number of times during the vertical sync period, it is stopped. In this case, the lens microcomputer 1330 waits for a vertical sync signal in step S1602.

In step S1607, the lens microcomputer 1330 determines whether A/D conversion has ended. Operations in steps S1607 to S1613 are the same as those in steps S810 to S816 of FIG. 8, and a description thereof will not be repeated. In step S1614, the lens microcomputer 1330 determines whether the number of times of A/D conversion has reached the target value. If the number of times of A/D conversion has reached the target value, the timing to acquire data necessary for rolling shutter distortion correction has come, and the lens microcomputer 1330 calculates a residual blur amount from the blur amount calculation result and shift lens position information in step S1615. In step S1616, the lens microcomputer 1330 stores, in the buffer, the result of calculation in step S1615 and information representing the data sampling A/D conversion count. In step S1617, the lens microcomputer 1330 increments the number-of-times counter. In step S1618, the lens microcomputer 1330 sets a new target value of the A/D conversion counter by looking up the table shown in FIG. 15. If the A/D counter has not reached the target value, processes in steps S1615 to S1618 are skipped, and the lens microcomputer 1330 increments the A/D counter in step S1619. Processes up to step S1624 after step S1619 are the same as those in steps S823 to S828 of FIG. 8, and a detailed description thereof will not be repeated.

As described above, residual blur data necessary for rolling shutter distortion correction is determined to be the value at almost the center of the exposure time by using the time in which A/D conversion is performed. This further improves the rolling shutter distortion correction effect.

Note that the timing to calculate residual blur data is set based on table data in the embodiment, but may be obtained by calculation from the number of readout lines of a CMOS sensor to be used and the time of one field.

At a high shutter speed (short exposure time), the timing to set residual blur data necessary for rolling shutter distortion correction to a value at the center of the exposure period cannot be selected. However, the accumulation time of the entire screen becomes short, so the rolling shutter distortion hardly occurs. For example, at a high shutter speed of 1/1000 or more, rolling shutter distortion correction processing may be stopped or data used for rolling shutter distortion correction processing may be fixed without any problem.

As described above, the rolling shutter distortion correction effect can be further enhanced by changing the data sampling timing to perform rolling shutter distortion correction in accordance with the exposure time (shutter speed) of the image capture system, obtaining a high-quality captured image.

Note that a change of the sampling timing based on the shutter speed becomes possible by using, for example, a buffer, as in the embodiment, even in a system in which a shake signal and shift lens position signal are sent simultaneously and a system in which a gyro sensor is mounted in the camera body. The respective systems can achieve the rolling shutter distortion correction effect, obtaining a higher-quality captured image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-179885, filed Aug. 14, 2012, which is hereby incorporated by reference herein in its entirety.

What is claimed is:

1. An image capture system including a camera body and a lens unit, comprising:

an image sensor configured to capture an object image formed by the lens unit, wherein said image sensor is arranged in the camera body;

a shake detection sensor configured to detect a shake;

a plurality of processors including at least a camera microcomputer arranged in the camera body and a lens microcomputer arranged in the lens unit, said microcomputers being programmed to implement the functions of a motion vector detection unit, an image stabilization unit, a correction amount detection unit, a distortion correction amount calculation unit and a distortion correction unit, wherein:

the motion vector detection unit is configured to detect a motion vector from the image, wherein said motion vector detection unit is included in a processor arranged in the camera body;

the image stabilization unit is configured to correct an image shake of the object image by an output from said shake detection sensor, wherein said image stabilization unit is included in a processor arranged in the lens unit;

the correction amount detection unit is configured to detect an optical image stabilization amount by said image stabilization unit;

the distortion correction amount calculation unit is configured to calculate a distortion correction amount of an image captured by said image sensor, based on a difference between an output from said shake detection sensor and an output from said correction amount detection unit; and the distortion correction unit is configured to correct a distortion of the image based on the motion vector and an output from said distortion correction amount calculation unit; and wherein said distortion correction amount calculation unit acquires the difference a plurality of times during a vertical sync period, and timings to acquire the difference the plurality of times are decided based on exposure time information set in the camera body and transmitted to the lens unit.

2. The system according to claim 1, wherein said shake detection sensor and said correction amount detection unit are arranged in the lens unit, and a shake amount of the image capture system and a correction amount of said image stabilization unit are transmitted from the lens unit to the camera body via a connection unit.

3. The system according to claim 1, wherein said correction amount detection unit is arranged in the lens unit, and a correction amount of said image stabilization unit is transmitted from the lens unit to the camera body via a connection unit.

4. The system according to claim 1, wherein timings of acquisition or detection performed a plurality of times during the vertical sync period, which are decided based on the exposure time information, are equally assigned to accumulation times of a CMOS image sensor during the vertical sync period, and are substantially at centers of the accumulation times for respective lines.

5. An image capture system including a camera body and a lens unit, comprising:
- an image sensor configured to capture an object image formed by the lens unit, wherein said image sensor is arranged in the camera body;
- a shake detection sensor configured to detect a shake;
- a plurality of processors including at least a camera microcomputer arranged in the camera body and a lens microcomputer arranged in the lens unit, said microcomputers being programmed to implement the functions of a motion vector detection unit, an image stabilization unit, a correction amount detection unit, a distortion correction amount calculation unit and a distortion correction unit, wherein:
the motion vector detection unit is configured to detect a motion vector from the image, wherein said motion vector detection unit is included in a processor arranged in the camera body;
the image stabilization unit is configured to correct an image shake of the object image by an output from said shake detection sensor, wherein said image stabilization unit is included in a processor arranged in the lens unit;
the correction amount detection unit is configured to detect an optical image stabilization amount by said image stabilization unit;
the distortion correction amount calculation unit is configured to calculate a distortion correction amount of an image captured by said image sensor, based on a difference between an output from said shake detection sensor and an output from said correction amount detection unit; and
the distortion correction unit is configured to correct a distortion of the image based on the motion vector and an output from said distortion correction amount calculation unit; and
wherein a correction amount of said image stabilization unit is detected a plurality of times during a vertical sync period, and the plurality of detection timings are decided based on exposure time information set in the camera body and transmitted to the lens unit.

6. An image capture system including a camera body and a lens unit, comprising:
- an image sensor configured to capture an object image formed by the lens unit, wherein said image sensor is arranged in the camera body;
- a shake detection sensor configured to detect a shake;
- a plurality of processors including at least a camera microcomputer arranged in the camera body and a lens microcomputer arranged in the lens unit, said microcomputers being programmed to implement the functions of a motion vector detection unit, an image stabilization unit, a correction amount detection unit, a distortion correction amount calculation unit and a distortion correction unit, wherein:
the motion vector detection unit is configured to detect a motion vector from the image, wherein said motion vector detection unit is included in a processor arranged in the camera body;
the image stabilization unit is configured to correct an image shake of the object image by an output from said shake detection sensor, wherein said image stabilization unit is included in a processor arranged in the lens unit;
the correction amount detection unit is configured to detect an optical image stabilization amount by said image stabilization unit;
the distortion correction amount calculation unit is configured to calculate a distortion correction amount of an image captured by said image sensor, based on a difference between an output from said shake detection sensor and an output from said correction amount detection unit; and
the distortion correction unit is configured to correct a distortion of the image based on the motion vector and an output from said distortion correction amount calculation unit; and
wherein a shake amount of the image capture system is detected a plurality of times during a vertical sync period, and the plurality of detection timings are decided based on exposure time information set in the camera body and transmitted to the lens unit.

7. An image capture apparatus in which a lens unit is detachable from a camera body, comprising:
- an image sensor configured to capture an object image formed by the lens unit;
- a plurality of processors including at least a camera microcomputer arranged in the camera body and a lens microcomputer arranged in the lens unit, said microcomputers being programmed to implement the functions of a motion vector detection unit, a shake information reception detection unit, a position reception unit, a residual blur amount calculation unit, a distortion correction amount calculation unit and a distortion correction unit, wherein:
the motion vector detection unit is configured to detect a motion vector from the image;
the shake information reception detection unit is configured to receive shake information detected by a shake detection sensor;
the position reception unit is configured to receive position information of an optical image stabilization member;
the residual blur amount calculation unit is configured to calculate a residual blur amount based on a difference between the shake information and the position information;
the distortion correction amount calculation unit is configured to calculate a distortion correction amount of an image captured by said image sensor based on the residual blur amount; and the distortion correction unit is configured to correct a distortion of the image based on the motion vector and an output from said distortion correction amount calculation unit; and wherein said distortion correction amount calculation unit acquires the difference a plurality of times during a vertical sync period, and timings to acquire the difference the plurality of times are decided based on exposure time information set in the camera body and transmitted to the lens unit.

8. An image capture apparatus in which a lens unit is detachable from a camera body, comprising:

an image sensor configured to capture an object image formed by the lens unit;

a plurality of processors including at least a camera microcomputer arranged in the camera body and a lens microcomputer arranged in the lens unit, said microcomputers being programmed to implement the functions of a motion vector detection unit, a shake information reception detection unit, a position reception unit, a residual blur amount calculation unit, a distortion correction amount calculation unit and a distortion correction unit, wherein:

the motion vector detection unit is configured to detect a motion vector from the image;

the shake information reception detection unit is configured to receive shake information detected by a shake detection sensor;

the position reception unit is configured to receive position information of an optical image stabilization member;

the residual blur amount calculation unit is configured to calculate a residual blur amount based on the shake information and the position information;

the distortion correction amount calculation unit is configured to calculate a distortion correction amount of an image captured by said image sensor based on the residual blur amount; and the distortion correction unit is configured to correct a distortion of the image based on the motion vector and an output from said distortion correction amount calculation unit; and wherein a correction amount of said image stabilization unit is detected a plurality of times during a vertical sync period, and the plurality of detection timings are decided based on exposure time information set in the camera body and transmitted to the lens unit.

9. An image capture apparatus in which a lens unit is detachable from a camera body, comprising:

an image sensor configured to capture an object image formed by the lens unit; a plurality of processors including at least a camera microcomputer arranged in the camera body and a lens microcomputer arranged in the lens unit, said microcomputers being programmed to implement the functions of a motion vector detection unit, a shake information reception detection unit, a position reception unit, a residual blur amount calculation unit, a distortion correction amount calculation unit and a distortion correction unit, wherein:

the motion vector detection unit is configured to detect a motion vector from the image;

the shake information reception detection unit is configured to receive shake information detected by a shake detection sensor;

the position reception unit is configured to receive position information of an optical image stabilization member;

the residual blur amount calculation unit is configured to calculate a residual blur amount based on the shake information and the position information;

the distortion correction amount calculation unit is configured to calculate a distortion correction amount of an image captured by said image sensor based on the residual blur amount; and the distortion correction unit is configured to correct a distortion of the image based on the motion vector and an output from said distortion correction amount calculation unit; and wherein a shake amount of the image capture apparatus is detected a plurality of times during a vertical sync period, and the plurality of detection timings are decided based on exposure time information set in the camera body and transmitted to the lens unit.

10. An image capture system including a camera body and a lens unit, the lens unit comprising:

a lens microcomputer programmed to implement the functions of an image stabilization unit, a correction amount detection unit and a position detection unit, wherein:

the image stabilization unit is configured to correct an image shake of an object image by an output from a shake detection sensor;

the correction amount detection unit is configured to detect an optical image stabilization amount by said image stabilization unit; and the position detection unit is configured to detect a position of said image stabilization unit and output position information, and the camera body comprising:

an image sensor configured to capture an object image formed by the lens unit;

the shake detection sensor configured to detect a shake;

a camera microcomputer programmed to implement the functions of a motion vector detection unit, a distortion correction amount calculation unit, and a distortion correction unit, wherein:

the motion vector detection unit is configured to detect a motion vector from the image;

the distortion correction amount calculation unit is configured to calculate a distortion correction amount of an image captured by said image sensor, based on an output from said shake detection sensor and the position information from said position detection unit; and the distortion correction unit is configured to correct a distortion of the image based on the motion vector and an output from said distortion correction amount calculation unit, wherein said distortion correction amount calculation unit acquires the difference a plurality of times during a vertical sync period, and timings to acquire the difference the plurality of times are decided based on exposure time information set in the camera body and transmitted to the lens unit.

11. An image capture system including a camera body and a lens unit, the lens unit comprising:

a lens microcomputer programmed to implement the functions of an image stabilization unit, a correction amount detection unit and a position detection unit, wherein:

the image stabilization unit is configured to correct an image shake of an object image by an output from a shake detection sensor;

the correction amount detection unit is configured to detect an optical image stabilization amount by said image stabilization unit; and the position detection unit is configured to detect a position of said image stabilization unit and output position information, and the camera body comprising:

an image sensor configured to capture an object image formed by the lens unit;

the shake detection sensor configured to detect a shake;

a camera microcomputer programmed to implement the functions of a motion vector detection unit, a distortion correction amount calculation unit, and a distortion correction unit, wherein:

the motion vector detection unit is configured to detect a motion vector from the image;

the distortion correction amount calculation unit is configured to calculate a distortion correction amount of an image captured by said image sensor, based on an output from said shake detection sensor and the position information from said position detection unit; and the distortion correction unit is configured to correct a distortion of the image based on the motion vector and an output from said distortion correction amount calculation unit, wherein a correction amount of said image stabilization unit is detected a plurality of times during a vertical sync period, and the plurality of detection timings are decided based on exposure time information set in the camera body and transmitted to the lens unit.

12. An image capture system including a camera body and a lens unit, the lens unit comprising:

a lens microcomputer programmed to implement the functions of an image stabilization unit, a correction amount detection unit and a position detection unit, wherein:

the image stabilization unit is configured to correct an image shake of an object image by an output from a shake detection sensor;

the correction amount detection unit is configured to detect an optical image stabilization amount by said image stabilization unit; and the position detection unit is configured to detect a position of said image stabilization unit and output position information, and the camera body comprising:

an image sensor configured to capture an object image formed by the lens unit;

the shake detection sensor configured to detect a shake;

a camera microcomputer programmed to implement the functions of a motion vector detection unit, a distortion correction amount calculation unit, and a distortion correction unit, wherein:

the motion vector detection unit is configured to detect a motion vector from the image;

the distortion correction amount calculation unit is configured to calculate a distortion correction amount of an image captured by said image sensor, based on an output from said shake detection sensor and the position information from said position detection unit; and the distortion correction unit is configured to correct a distortion of the image based on the motion vector and an output from said distortion correction amount calculation unit, wherein a shake amount of the image capture system is detected a plurality of times during a vertical sync period, and the plurality of detection timings are decided based on exposure time information set in the camera body and transmitted to the lens unit.

* * * * *